US008183729B2

(12) United States Patent
Takeuchi

(10) Patent No.: US 8,183,729 B2
(45) Date of Patent: May 22, 2012

(54) ELECTRICALLY POWERED DEVICE

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/250,002

(22) Filed: Oct. 13, 2008

(65) Prior Publication Data

US 2009/0096310 A1 Apr. 16, 2009

(30) Foreign Application Priority Data

Oct. 16, 2007 (JP) ................................. 2007-269314

(51) Int. Cl.
*H02K 16/00* (2006.01)
*H02K 11/00* (2006.01)
*H02K 21/12* (2006.01)
*H02K 1/22* (2006.01)

(52) U.S. Cl. ................. 310/114; 310/67 R; 310/156.37; 310/268

(58) Field of Classification Search .................. 310/114, 310/156.36, 115, 156.37, 261.1, 268; 415/68; 417/423.14, 247, 353, 354
See application file for complete search history.

(56) References Cited

U.S. PATENT DOCUMENTS

| | | | | |
|---|---|---|---|---|
| 5,061,868 A | * | 10/1991 | Iwazaki et al. ............... | 310/67 R |
| 5,258,676 A | * | 11/1993 | Reinhardt et al. ............. | 310/112 |
| 6,363,808 B1 | * | 4/2002 | Wakabayashi et al. .... | 74/490.03 |
| 6,439,037 B1 | * | 8/2002 | D'Angelo ................... | 73/116.08 |
| 6,565,334 B1 | * | 5/2003 | Bradbury et al. ........... | 417/423.1 |
| 2001/0017250 A1 | * | 8/2001 | Boffelli et al. ............... | 192/48.2 |
| 2005/0082927 A1 | * | 4/2005 | Conrady et al. ............... | 310/90 |
| 2005/0194862 A1 | * | 9/2005 | Qu et al. ....................... | 310/268 |

FOREIGN PATENT DOCUMENTS

| | | | |
|---|---|---|---|
| JP | 55-109168 | | 8/1980 |
| JP | 01-132740 | | 9/1989 |
| JP | 03194198 A | * | 8/1991 |
| JP | 2001-298982 | | 10/2001 |
| WO | WO 2006097818 A1 | * | 9/2006 |

OTHER PUBLICATIONS

Translation JP03194198 (1991).*

* cited by examiner

*Primary Examiner* — Quyen Leung
*Assistant Examiner* — Jose Gonzalez Quinones
(74) *Attorney, Agent, or Firm* — Harness, Dickey & Pierce, P.L.C.

(57) ABSTRACT

The electrically powered device is provided. The electrically powered device includes: multiple stators structured to respectively have electromagnetic coils and position sensors; a shaft fastened to the multiple stators; and multiple rotors structured to respectively have permanent magnets and arranged to rotate around the shaft; wherein the multiple rotors are connected with a driven member driven by the electrically powered device.

5 Claims, 25 Drawing Sheets

Fig.3A
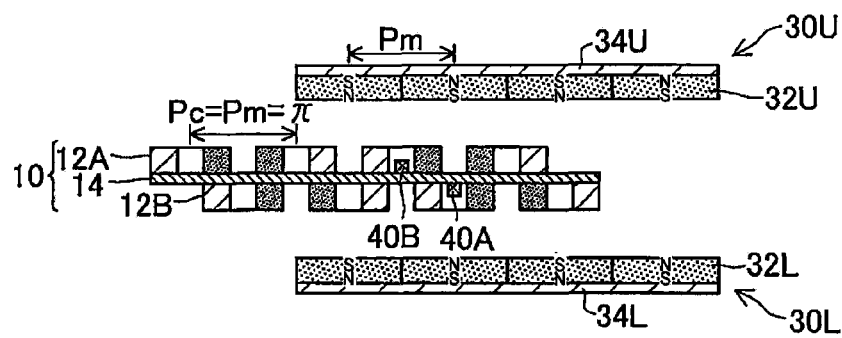
Fig.3B Back electromotive force Ec
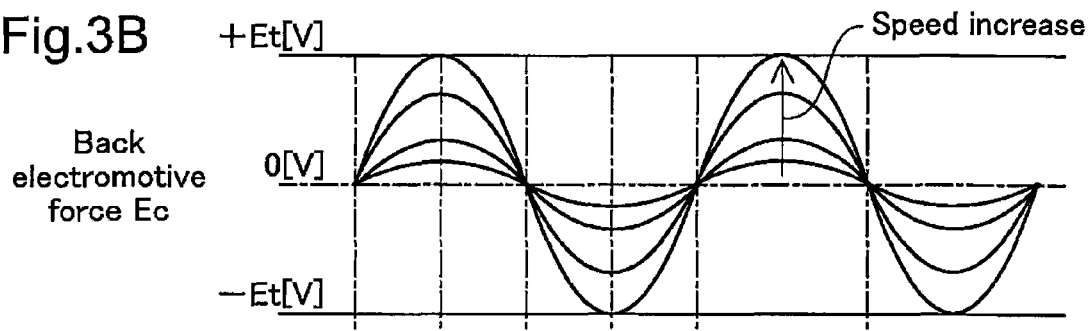
Fig.3C Sensor output SSA
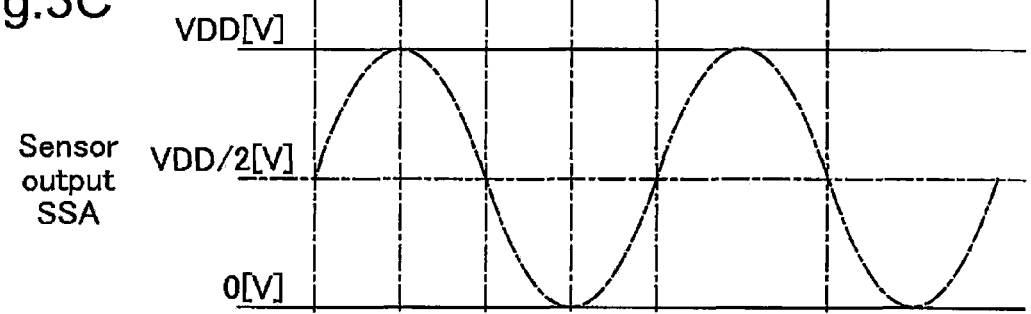
Fig.3D Sensor output SSB
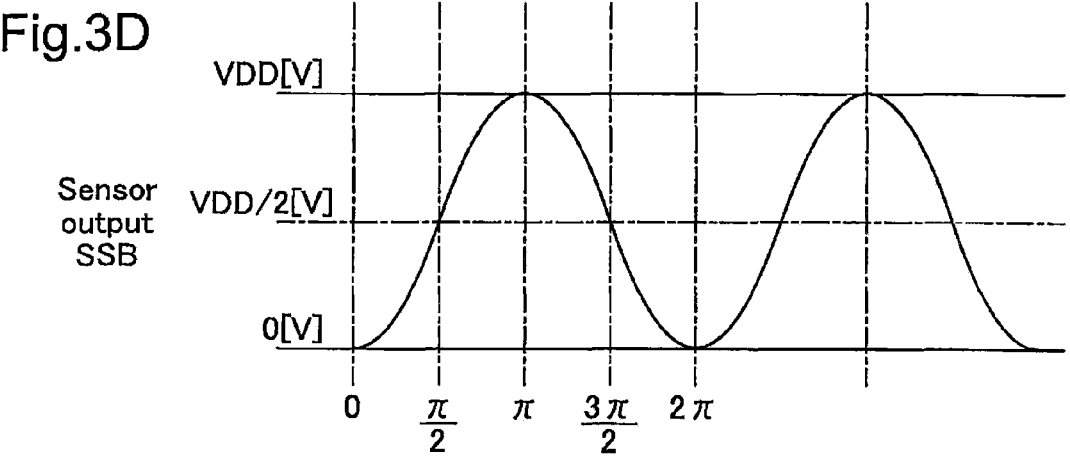

Fig.5A
Forward rotation
Immediately before phase = 0
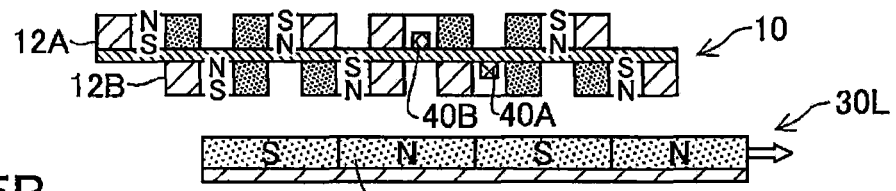
Fig.5B
Immediately before phase = π/2
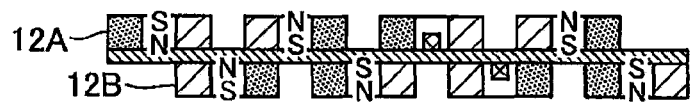
Fig.5C
Immediately before phase = π
Fig.5D
Immediately before phase = 3π/2

Reverse rotation

Immediately before
phase = 0

Immediately before
phase = $\pi/2$

Immediately before
phase = $\pi$

Immediately before
phase = $3\pi/2$

Fig.8
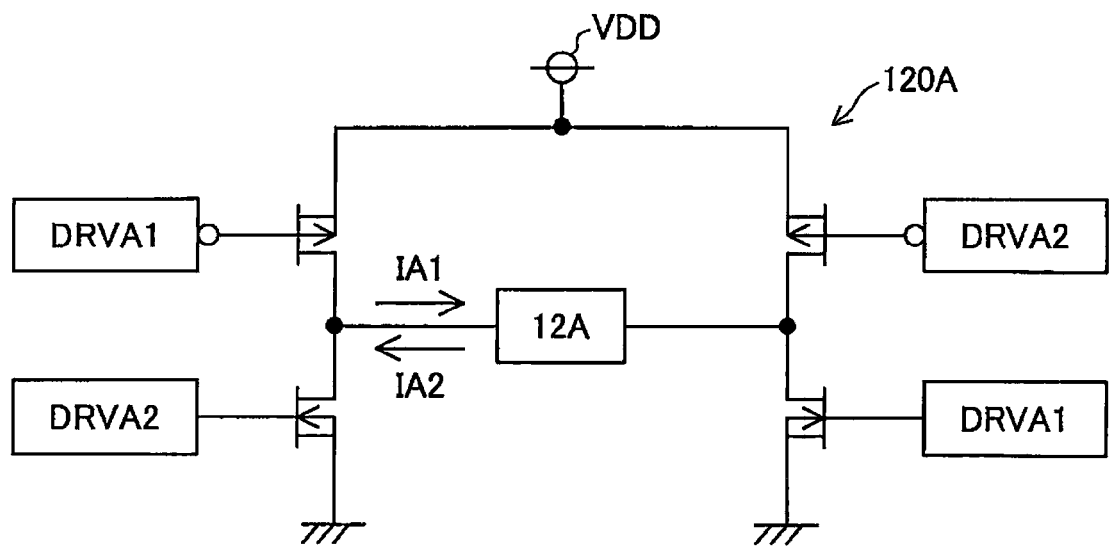
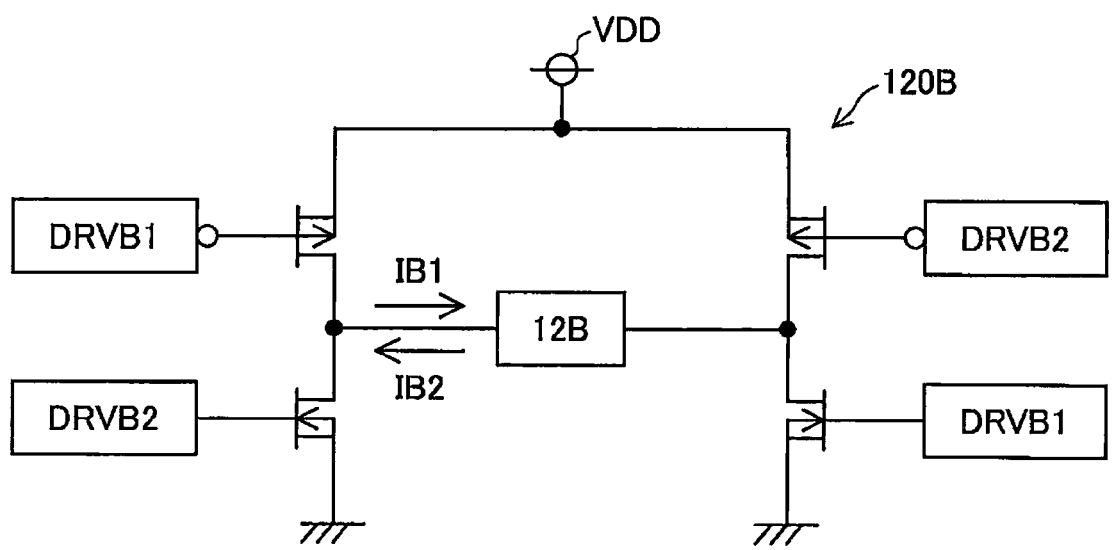

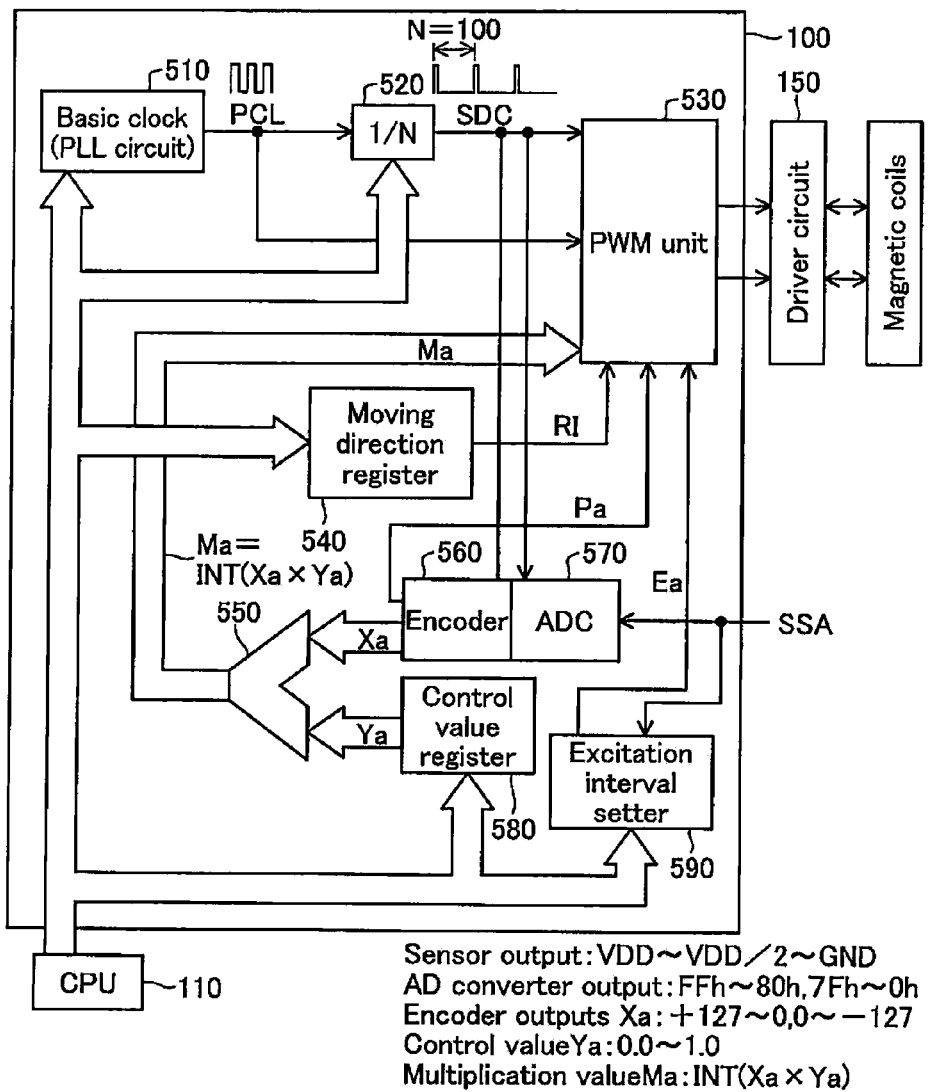

Fig.10A
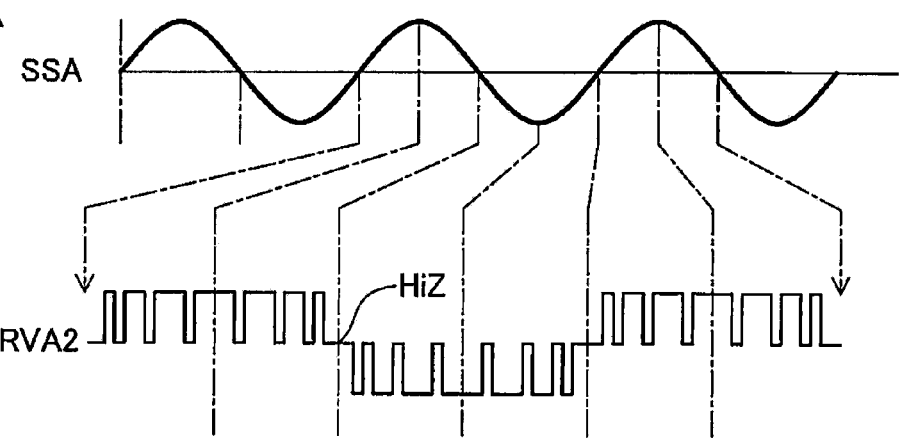
Fig.10B
Fig.10C
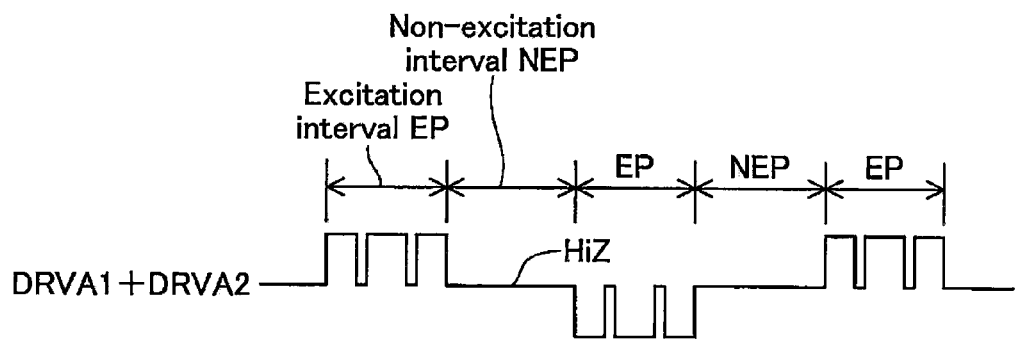

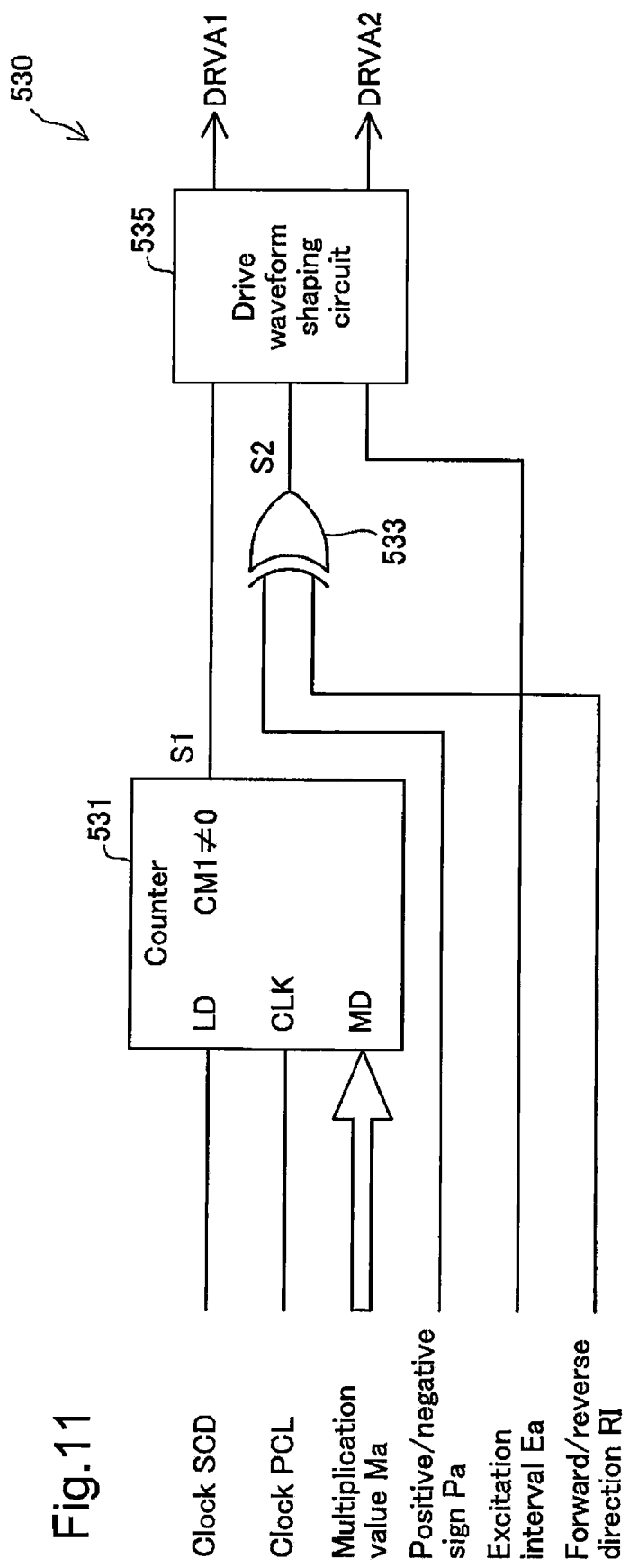

During forward rotation (RI = "L")

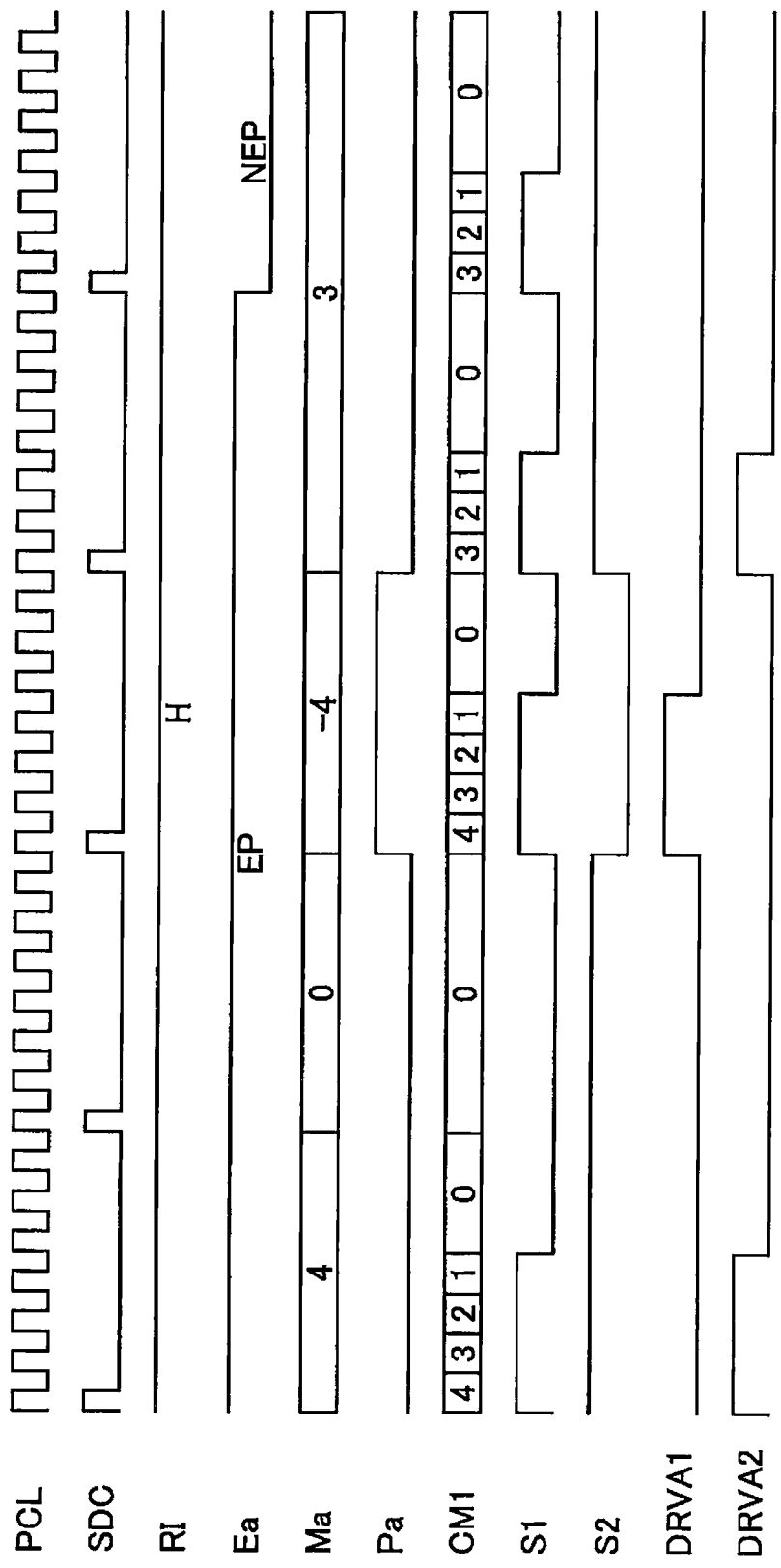

Driving by rectangular wave

Current attenuates in association with increased speed

Driving by sine wave

Current attenuates in association with increased speed

Fig.16
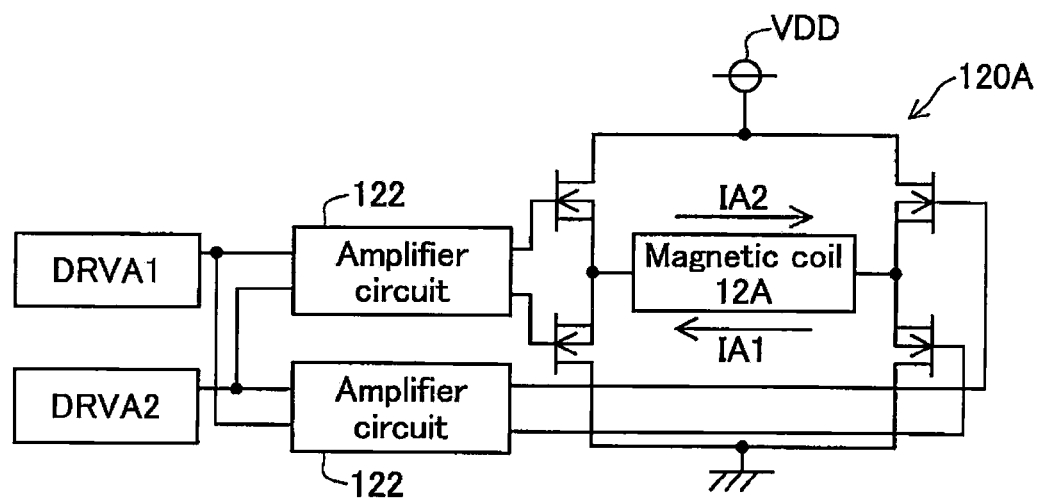
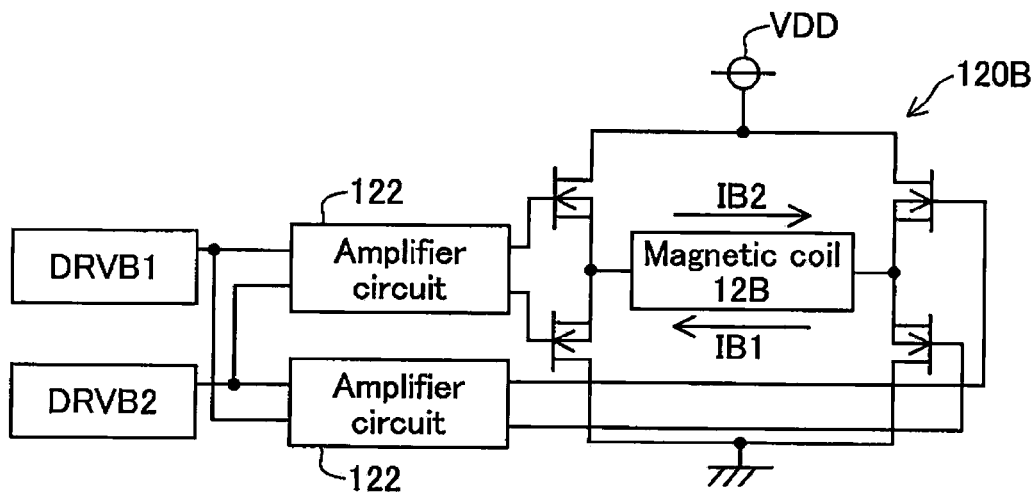

Very low voltage drive characteristics
(stable rotation characteristics in unloaded state)

ELECTRICALLY POWERED DEVICE

CROSS-REFERENCE TO RELATED APPLICATIONS

The present application claims the priority based on Japanese Patent Application No. 2007-269314 filed on Oct. 16, 2007, the disclosure of which is hereby incorporated by reference in its entirety.

BACKGROUND OF THE INVENTION

1. Field of the Invention

The present invention relates to a brushless motor using permanent magnets and electromagnetic coils.

2. Description of the Related Art

One proposed structure of the brushless motor using the permanent magnets and the electromagnetic coils is disclosed in, for example, Japanese Patent Laid-Open No. 2001-298982.

In the electric motor of the prior art structure, a rotor rotates in a stator, and the rotational motion of the rotor is transmitted to a rotating shaft by fixation of the rotor to the rotating shaft. The rotational motion of the rotating shaft is then transmitted to a driven member, such as a wheel, via a gear or another equivalent transmission mechanism or direct coupling of the rotating shaft with the driven member. In this conventional structure, however, a torsion occurring on the rotating shaft undesirably causes delayed transmission of the rotational motion of the rotor to the wheel or another driven member and requires high torsion strength of the rotating shaft for transmission of a large rotational force. These problems are not limited to the motors but are also found in generators. In the motor of this prior art structure, only one rotating shaft is directly rotatable by one motor, so that the driven member is linked with the one rotating shaft.

SUMMARY

An object of the present invention is to provide technology that is able to provide multiple rotors arranged on one shaft of an electrically powered device and connecting a driven member with the multiple rotors.

According to an aspect of the present invention, an electrically powered device is provided. The electrically powered device comprises: multiple stators structured to respectively have electromagnetic coils and position sensors; a shaft fastened to the multiple stators; and multiple rotors structured to respectively have permanent magnets and arranged to rotate around the shaft; wherein the multiple rotors are connected with a driven member driven by the electrically powered device.

According to this configuration, the multiple rotors rotate around the non-rotatable shaft fastened to the multiple stators. The multiple rotors are thus arranged on one shaft and are connected with the driven member.

The technique of the invention is not restricted to the electrically powered device having any of the above configurations but may also be actualized by a diversity of other applications, for example, a brushless motor, a brushless generator, control methods or driving methods of the brushless motor and the brushless generator, and an actuator and a generation system equipped with the brushless motor and the brushless generator.

BRIEF DESCRIPTION OF THE DRAWINGS

FIGS. 3A-3D illustrate the relationship of sensor output and back electromotive force waveform;

FIGS. 5A-5D are illustrations depicting forward rotation operation of the brushless motor in the first embodiment;

FIG. 8 shows a configuration of a phase A driver circuit and a phase B driver circuit included in the driver circuit;

FIGS. 9A-9E illustrate internal configuration and operation of the drive controller;

FIGS. 10A-10C depict correspondence between sensor output waveform and waveform of the drive signals generated by the PWM unit;

FIG. 11 is a block diagram depicting the internal configuration of the PWM unit;

FIG. 13 is a timing chart depicting operation of the PWM unit during reverse rotation of the motor;

FIG. 16 depicts another configuration example of the phase A driver circuit and the phase B driver circuit included in the driver circuit;

DESCRIPTION OF THE PREFERRED EMBODIMENT

Next, aspects of the present invention will be described in the following order on the basis of embodiments.

A. First Embodiment

A1. General Configuration of Electrically Powered Device and Outline of Operations in First Embodiment:

A2. Configuration of Drive Circuit Unit:
A3. Other Aspects of Electrically Powered Device of First Embodiment:
B. Second Embodiment:
C. Third Embodiment:
D. Modified Examples:

A. FIRST EMBODIMENT

Figure 1:
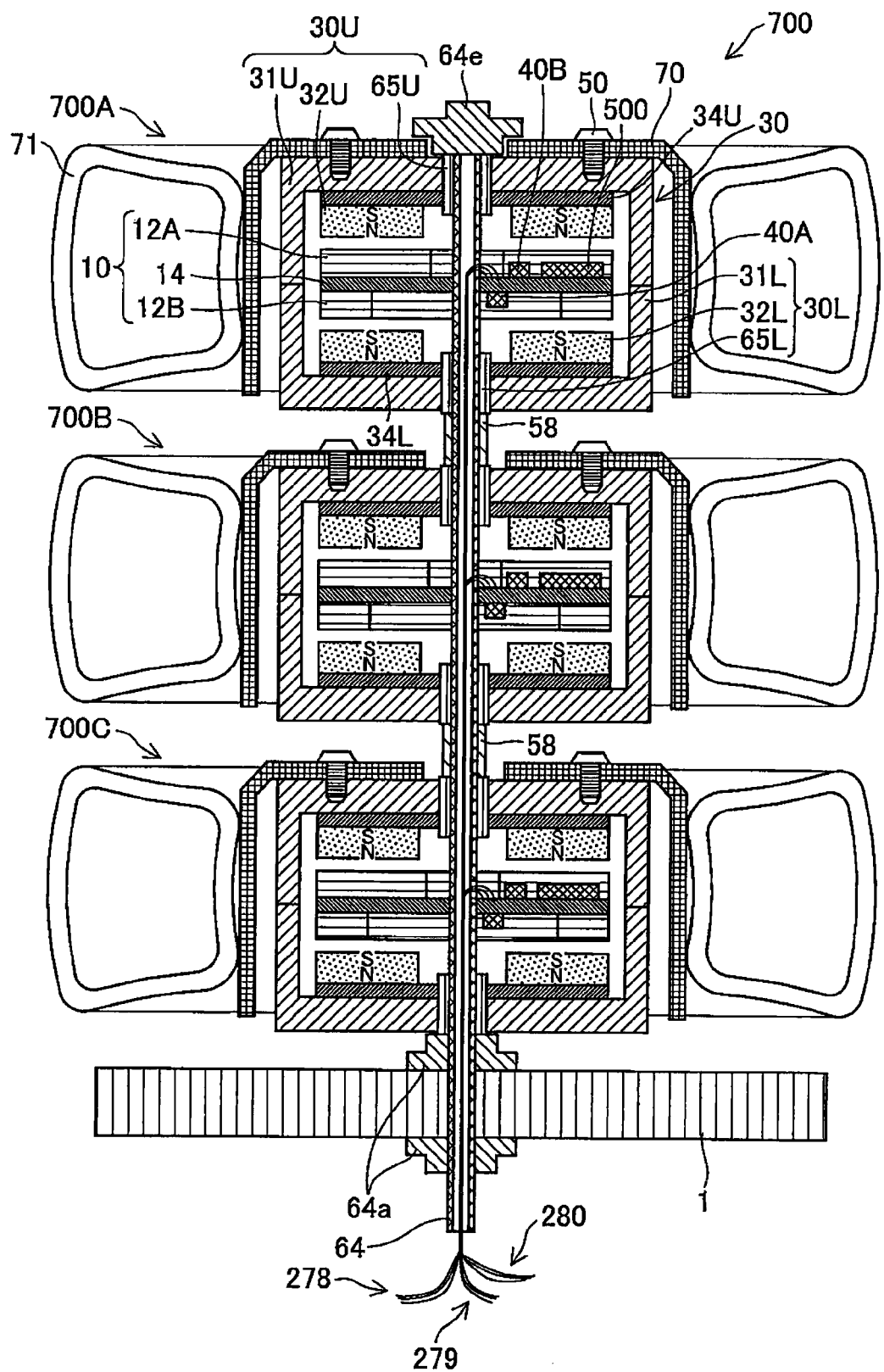
FIG. 1 is a sectional view showing the schematic structure of an electrically powered device in a first embodiment.

A1. General Configuration of Electrically Powered Device and Outline of Operations in First Embodiment FIG. 1 is a sectional view showing the schematic structure of an electrically powered device 700 in a first embodiment. The electrically powered device 700 has three brushless motors 700A, 700B, and 700C arranged on a shaft 64. The three brushless motors 700A, 700B, and 700C are respectively separated by spacers 58. The spacers 58 are fastened to fix the positions of the three brushless motors 700A, 700B, and 700C in an axial direction along the shaft 64. The internal structure of the brushless motor 700A is described below. The other brushless motors 700B and 700C have the identical internal structure with that of the brushless motor 700A.

The brushless motor 700A has a stator unit 10 and a rotor unit 30 arranged on the shaft 64. Both the stator unit 10 and the rotor unit 30 are constructed as substantially disk-shaped components. The shaft 64 is attached to an electrically powered device support member 1 by means of shaft fixation elements 64a to be fastened in a non-rotatable manner. In the structure of this embodiment, the electrically powered device support member 1 is a suspension of a moving body, such as a vehicle. The rotor unit 30 has an upper rotor unit 30U and a lower rotor unit 30L.

Figure 2A:
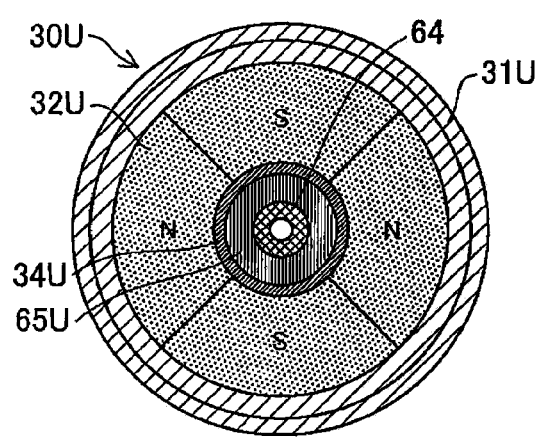
FIG. 2A is a horizontal sectional view showing the schematic structure of the upper rotor unit.

FIG. 2A is a horizontal sectional view showing the schematic structure of the upper rotor unit 30U. The upper rotor unit 30U includes an upper rotational casing 31U, a bearing 65U, and four quasi-fan-shaped permanent magnets 32U. The upper rotor unit 30U is rotatable about the shaft 64 via the bearing 65U. The bearing 65U may be a ball bearing. The lower rotor unit 30L has the similar structure to that of the upper rotor unit 30U and is thus not specifically illustrated. The magnetizing direction of the respective permanent magnets 32U and 32L are parallel to the extending direction of the shaft 64. A shaft end fixation member 64e is attached to one end of the shaft 64 to prevent the bearing 65U from being slipped off by the rotation (see FIG. 1). A wheel base 70 is fastened to the upper rotational casing 31U by means of fixation screws 50. A wheel 71 working as a wheel of the moving body is set around the periphery of the wheel base 70.

Figure 2B:
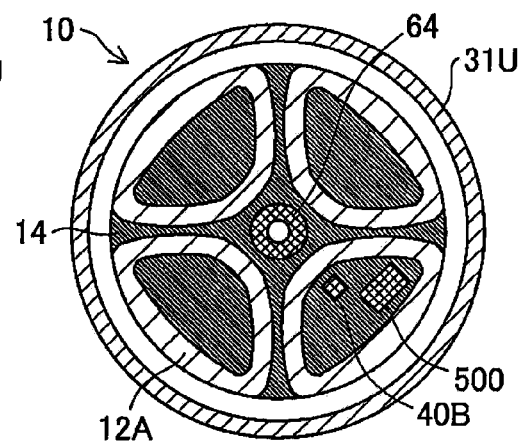
FIG. 2B is a horizontal sectional view showing the schematic structure of the stator unit.

FIG. 2B is a horizontal sectional view showing the schematic structure of the stator unit 10. As illustrated in FIG. 1, the stator unit 10 has multiple Phase A coils 12A, multiple Phase B coils 12B, and a support member 14 for supporting these coils 12A and 12B. FIG. 2B shows the stator unit 10 from the side of the Phase A coils 12A. In this illustrated example, there are four Phase A coils 12A as well as four Phase B coils 12B wound in a substantially fan shape. The stator unit 10 also has a drive circuit unit 500. As shown in FIG. 1, the shaft 64 preferably has a hollow center to receive therethrough a driving power line 278 for supply of electric power to the respective coils 12 and a control line 279 for sending signals to the drive circuit unit 500. In recovery of regenerative electric power from the respective coils 12 (explained later), a recovery power line 280 (regenerative power line 280) is preferably arranged through the hollow center of the shaft 64. This structure desirably saves the space for wiring.

In the motor of the above structure, the rotor unit 30 is rotated about the shaft 64 to rotate the wheel 71, while the shaft 64 is fixed not to rotate (see FIG. 1). No torsion force is thus applied to the shaft 64. This structure does not require the high torsion strength of the shaft 64 and enables weight reduction of the motor. The free-torsion shaft 64 and the non-requirement of a gear or another equivalent transmission mechanism lead to substantially no transmission loss and enable the stable control and the high-speed response. This structure is effective especially in attitude control requiring the high-speed response of normal rotation and reverse rotation.

In the electrically powered device 700 of the embodiment, the three brushless motors 700A, 700B, and 700C are rotated about the shaft 64 independently or in an interconnected manner. For example, rotating the three brushless motors 700A, 700B, and 700C in an identical direction generates a torque that is three times as much as the torque generated by only one motor. In another example, one of the three motors is used in a drive mode, while the other two motors are used in a regenerative mode. The three motors may be designed to have characteristics specialized for different applications, for example, high-speed rotation, high-torque generation, and electric power regeneration. The on-off states of these motors may be changed over according to the applications or these motors of different characteristics may be used simultaneously.

In maintenance of the motor, simple release of the shaft fixation elements 64a enables the motor with the shaft 64 to be detached from the moving body, such as the suspension 1. Namely the upper rotor unit 30U and the lower rotor unit 30L are readily disassembled. This structure attains the favorable overall maintenance property for the maintenance of the wheel 71, the wheel base 70, the shaft 64, the stator unit 10, and the rotor unit 30. The stator unit 10 and the rotor unit 30 are easily replaceable with another stator unit and another rotor unit having other properties and characteristics. This enables easy change and improvement of the power characteristics of the moving body. The wheel base 70 and the wheel 71 are easily attachable and detachable to and from the rotor unit 30 by means of the fixation screws 50. The wheel base 70 and the wheel 71 are thus separable from the motor main body for the purpose of maintenance. Heat produced in the rotor unit 30 is releasable to the outside of the motor by utilizing the upper rotational casing 31U as a heat radiator structure. The motor of the embodiment accordingly has the high radiation performance.

As shown in FIG. 1, the complete coverage of the stator unit 10 with the upper rotational casing 31U and the lower rotational casing 31L easily attains a sealed structure having the high external stain resistance. The motor of this sealed structure is suitable for wheels of an amphibious vehicle. In application of the motor of this sealed structure to a fan motor in a dusty environment, the sealed structure effectively protects the inside of the motor from dust and is thus free of maintenance. The wheel base 70 and the wheel 71 of the embodiment are equivalent to the 'driven member' of the invention.

Figure 2C:
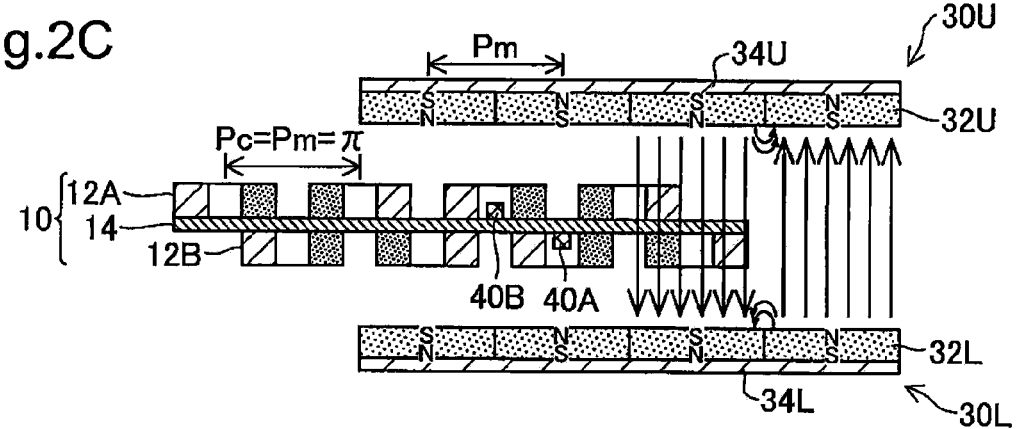
FIG. 2C is a conceptual diagram depicting the relationship of the stator unit and the upper and lower rotor units.

FIG. 2C is a conceptual diagram depicting the relationship of the stator unit 10 and the upper and lower rotor units 30U, 30L. However, the rotational casing 31 and the bearing 65 of the rotor unit 30 are omitted from this diagram. On the support member 14 of the stator unit 10 are provided a magnetic sensor 40A for phase A use and a magnetic sensor 40B for phase B use. The magnetic sensors 40A, 40B are used to detect the position of the rotor units 30U, 30L (i.e. the phase of the motor). These sensors will hereinafter be referred to as the "phase A sensor" and the "phase B sensor." The phase A sensor 40A is positioned at a center location between two of the phase A coils 12A. Similarly, the phase B sensor 40B is positioned at a center location between two of the phase B coils 12B. In this example, the phase B sensor 40B is positioned together with the phase A coils 12A at the upper face of the support member 14, but it could instead be positioned at the lower face of the support member 14. This applies to the phase A sensor 40A as well. As will be understood from FIG. 2B, in this embodiment, the phase B sensor 40B is positioned inside one of the phase A coils 12A, which has the advantage of ensuring space for placement of the sensor 40B.

As shown in FIG. 2C, the magnets 32U, 32L are each positioned at a constant magnetic pole pitch Pm, with adjacent magnets being magnetized in opposite directions. The phase A coils 12A are arranged at constant pitch Pc, with adjacent coils being excited in opposite directions. This applies to the phase B coils 12B as well. In the present embodiment, the magnetic pole pitch Pm is equal to the coil pitch Pc, and in terms of electrical angle is equivalent to π. An electrical angle of 2π is associated with the mechanical angle or distance of displacement when the phase of the drive signal changes by 2π. In the present embodiment, when the phase of the drive signal changes by 2π, the rotor units 30U, 30D undergo displacement by the equivalent of twice the magnetic pole pitch Pm. The phase A coils 12A and the phase B coils 12B are positioned at locations phase-shifted by π/2 from each other.

The magnets 32U of the upper rotor unit 30U and the magnets 32L of the lower rotor unit 30L are positioned with their magnetic poles which face towards the stator unit 10 having mutually different polarity (N pole and S pole). In other words, the magnets 32U of the upper rotor unit 30U and the magnets 32L of the lower rotor unit 30L are positioned with their opposite poles facing one another. As a result, as shown at the right end in FIG. 2C, the magnetic field between these magnets 32U, 32L will be represented by substantially straight magnetic field lines and will be closed between these magnets 32U, 32L. It will be appreciated that this closed magnetic field is stronger than the open magnetic field. As a result, magnetic field utilization efficiency will be higher, and it will be possible to improve motor efficiency. In preferred practice, magnetic yokes 34U, 34L made of a ferromagnetic body will be disposed respectively on the outside faces of the magnets 32U, 32L. The magnetic yokes 34U, 34L make it possible to further strengthen the magnetic field in the coils. However, the magnetic yokes 34U, 34L may be omitted.

Among the coils 12A and 12B, the magnetic sensors 40A and 40B, and the drive circuit unit 500, it is preferable to cover any or all of these with resin. By doing this, it is possible to suppress the corrosion of these. Also, if the resin covering the coils 12A, 12B is in contact with the axis unit 64, the heat generated from the coils 12A and 12B is conveyed to the axis unit 64, and it becomes possible to cool the coils 12A, 12B by using the axis unit 64 as the heat sink.

FIGS. 3A-3D illustrate the relationship of sensor output and back electromotive force waveform. FIG. 3A is identical to FIG. 2C. FIG. 3B shows an exemplary waveform of back electromotive force generated by the phase A coils 12A. FIGS. 3C and 3D show exemplary waveforms of sensor outputs SSA, SSB of the phase A sensor 40A and the phase B sensor 40B. These sensors 40A, 40B can generate sensor outputs SSA, SSB of shape substantially similar to the back electromotive force of the coils during motor operation. The back electromotive force of the coils 12A shown in FIG. 3B tends to rise together with motor speed but its waveform shape (sine wave) maintains substantially similar shape. Hall ICs that utilize the Hall effect, for example, could be employed as the sensors 40A, 40B. In this example, the sensor output SSA and the back electromotive force Ec are each a sine wave or waveform approximating a sine wave. As will be discussed later, the drive control circuit of this motor, utilizing the sensor outputs SSA, SSB, applies voltage of shape substantially similar to the back electromotive force Ec to the respective coils 12A, 12B.

An electric motor functions as an energy conversion device that converts between mechanical energy and electrical energy. The back electromagnetic force of the coils represents mechanical energy of the electric motor converted to electrical energy. Consequently, where electrical energy applied to the coils is converted to mechanical energy (that is, where the motor is driven), it is possible to drive the motor with maximum efficiency by applying voltage of similar waveform to the back electromagnetic force. As will be discussed below, "voltage of similar waveform to the back electromagnetic force" means voltage that generates current flowing in the opposite direction from the back electromagnetic force.

Figure 4A:
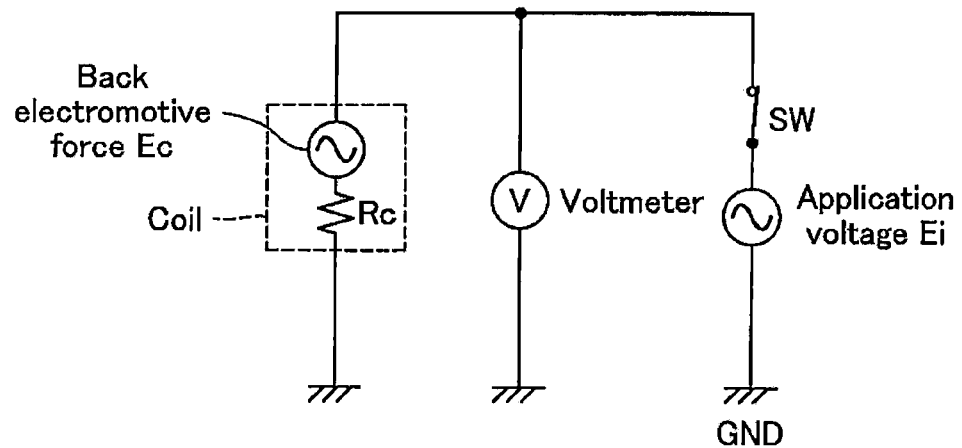
FIGS. 4A and 4B are model diagrams illustrating the relationship of applied voltage and electromotive force of a coil.

FIG. 4A is a model diagram illustrating the relationship of applied voltage and electromotive force of a coil. Here, the coil is simulated in terms of AC back electromotive force Ec and resistance Rc. In this circuit, a voltmeter V is parallel-connected to the AC application voltage Ei and the coil. The back electromotive force Ec is also termed "induced voltage Ec" and the application voltage Ei is also termed "exciting voltage Ei." When AC voltage Ei is applied to the coil to drive the motor, back electromotive force Ec will be generated a direction of current flow opposite that of the application voltage Ei. When a switch SW is opened while the motor is rotating, the back electromotive force Ec can be measured with the voltmeter V. The polarity of the back electromotive force Ec measured with the switch SW open will be the same as the polarity of the application voltage Ei measured with the switch SW closed. The phrase "application of voltage of substantially similar waveform to the back electromagnetic force" herein refers to application of voltage having the same polarity as, and waveform of substantially similar shape to, the back electromotive force Ec measured by the voltmeter V.

Figure 4B:
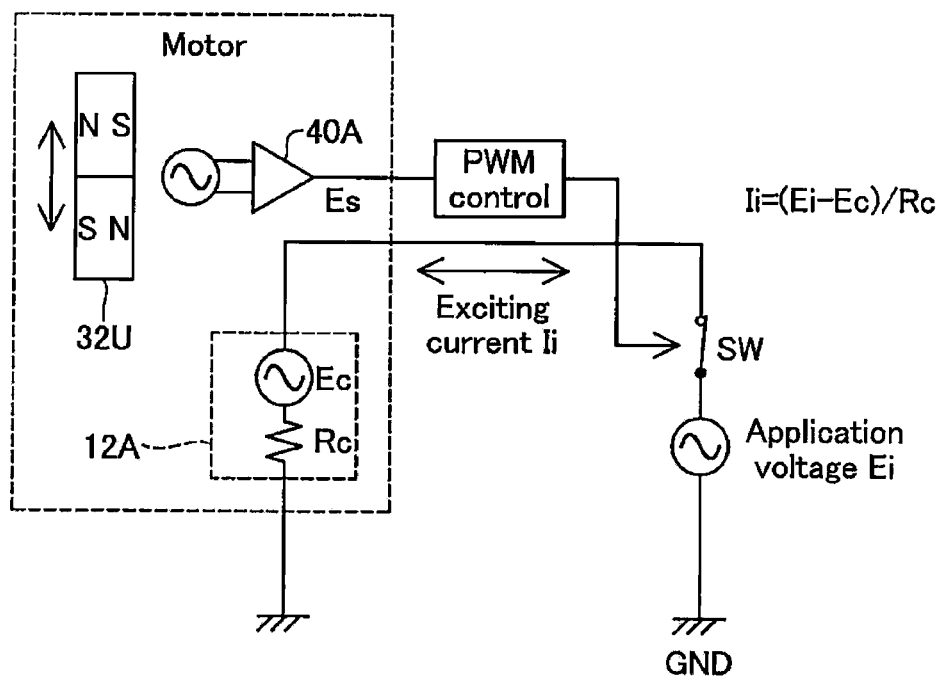
Figure 6A:
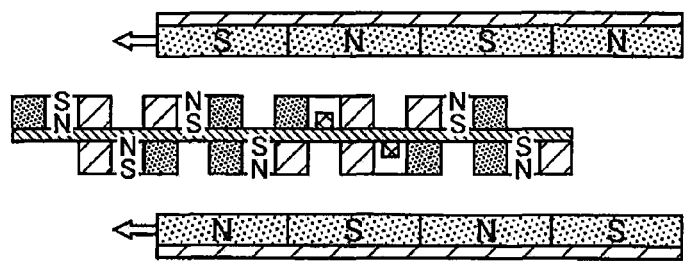
FIGS. 6A-6D are illustrations depicting reverse rotation operation of the brushless motor in the first embodiment.
Figure 6B:
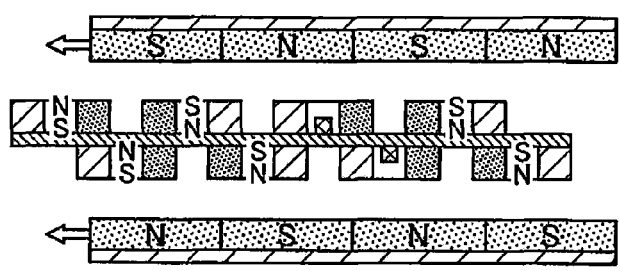
Figure 6C:
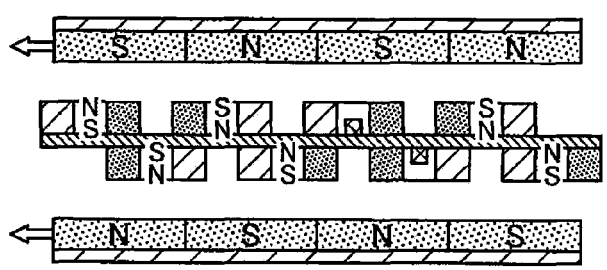
Figure 6D:
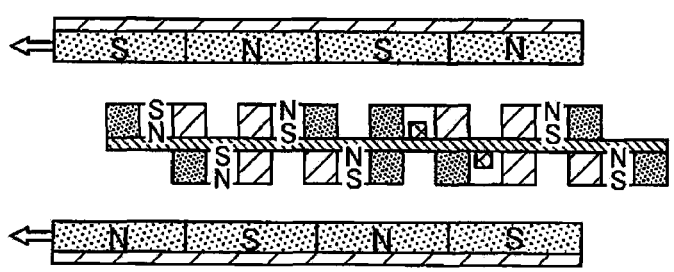

FIG. 4B illustrates an overview of the driving method employed in the present embodiment. Here, the motor is simulated by the phase A coils 12A, the permanent magnets 32U, and the phase A sensor 40A. When the rotor unit 30 having the permanent magnets 32U turns, AC voltage Es (also termed "sensor voltage Es") is generated in the sensor 40A. This sensor voltage Es has a waveform shape substantially similar to that of the induced voltage Ec of the coil 12A. Thus, by generating PWM signal which simulates the sensor voltage Es for on/off control of the switch SW it will be possible to apply to the coils 12A exciting voltage Ei of substantially similar waveform to the induced voltage Ec. The exciting current Ii at this time will be given by Ii=(Ei−Ec)/Rc.

As noted previously, when driving a motor, it is possible to drive the motor with maximum efficiency through application of voltage of waveform similar to that of the back electromagnetic force. It can be appreciated that energy conversion efficiency will be relatively low in proximity to the midpoint (in proximity to 0 voltage) of the sine wave waveform of back electromotive force, while conversely energy conversion efficiency will be relatively high in proximity to the peak of the back electromotive force waveform. Where a motor is driven by applying voltage of waveform similar to that of the back electromotive force, relatively high voltage can be applied during periods of high energy conversion efficiency, thereby improving efficiency of the motor. On the other hand, if the motor is driven with a simple rectangular waveform for example, considerable voltage will be applied in proximity to the position where back electromotive force is substantially 0 (midpoint) so motor efficiency will drop. Also, when voltage is applied during such periods of low energy conversion efficiency, due to eddy current vibration will be produced in directions other than the direction of rotation, thereby creating a noise problem.

As will be understood from the preceding discussion, the advantages of driving a motor through application of voltage of similar waveform to the back electromotive force are improved motor efficiency and reduced vibration and noise.

FIGS. 5A-5D are illustrations depicting forward rotation operation of the brushless motor of the embodiment. FIG. 5A depicts the state just before the phase reaches 0. The letters "N" and "S" shown at locations of the phase A coils 12A and the phase B coils 12B indicate the excitation direction of these coils 12A, 12B. When the coils 12A, 12B are excited, forces of attraction and repulsion are generated between the coils 12A, 12B and the magnets 32U, 32L. As a result, the rotor units 30U, 30L turn in the forward rotation direction (rightward in the drawing). At the timing of the phase going to 0, the excitation direction of the phase A coils 12A reverses (see FIGS. 3A-3D). FIG. 5B depicts a state where the phase has advanced to just before π/2. At the timing of the phase going to π/2, the excitation direction of the phase B coils 12B reverses. FIG. 5C depicts a state where the phase has advanced to just before π. At the timing of the phase going to π, the excitation direction of the phase A coils 12B again reverses. FIG. 5D depicts a state where the phase has advanced to just before 3π/2. At the timing of the phase going to 3π/2, the excitation direction of the phase B coils 12B again reverses.

As will be apparent from FIGS. 3C and 3D as well, at times at which the phase equals an integral multiple of π/2 the sensor outputs SSA, SSB will go to zero, and thus driving force will be generated from only one of the two sets of coils 12A, 12B. However, during all periods except for times at which the phase equals integral multiples of π/2, it will be possible for the sets of coils 12A, 12B of both phases to generate driving force. Consequently, high torque can be generated using the sets of coils 12A, 12B of both phases.

As will be apparent from FIG. 5A, the phase A sensor 40A is positioned such that the location at which the polarity of its sensor output switches will be situated at a location where the center of a phase A coil 12A faces the center of a permanent magnet 32U. Similarly, the phase B sensor 40B is positioned such that the location at which the polarity of the sensor output switches will be situated at a location where the center of a phase B coil 12A faces the center of a permanent magnet 32L. By positioning the sensors 40A, 40B at these locations, it will be possible to generate from the sensors 40A, 40B the sensor outputs SSA, SSB (FIGS. 3C and 3D) which have substantially similar waveform to the back electromotive force of the coils.

FIG. 6A-6D are illustrations depicting reverse rotation operation of the brushless motor of the embodiment. FIG. 6A-6D respectively depicts states where the phase has reached just before 0, π/2, π, and 3/π2. Reverse rotation operation can be accomplished, for example, by reversing the polarity of the drive voltages of the coils 12A, 12B to from that of the respective drive voltages during forward rotation operation.

A2. Configuration of Drive Circuit Unit

Figure 7:
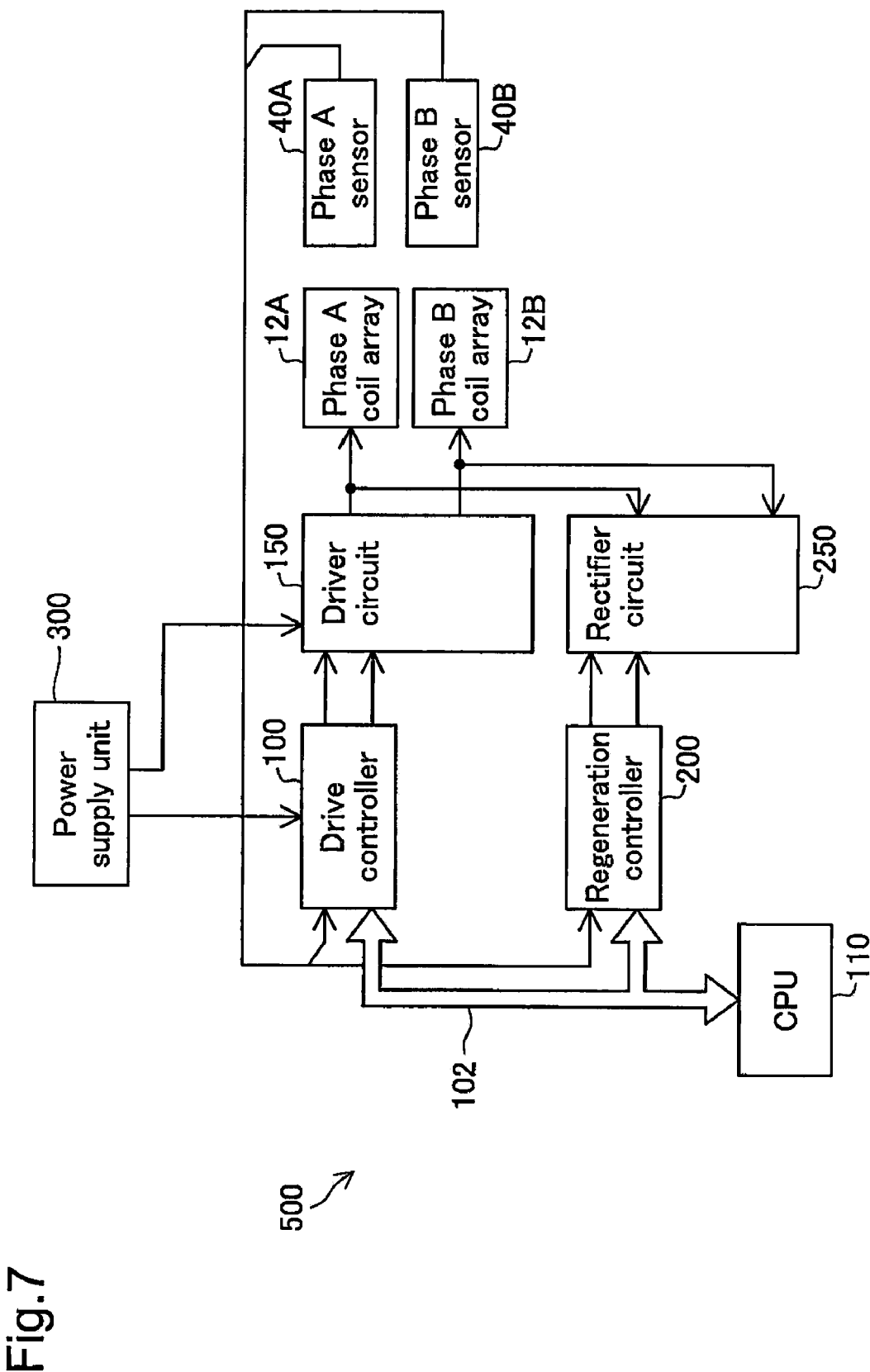
FIG. 7 is a block diagram depicting an internal configuration of a drive circuit unit in the first embodiment.

FIG. 7 is a block diagram depicting an internal configuration of a drive circuit unit in the present embodiment. The drive circuit unit 500 has a CPU 110, a drive controller 100, a regeneration controller 200, a driver circuit 150, a rectifier circuit 250, and a power supply unit 300. The two controllers 100, 200 are connected to the CPU 110 via a bus 102. The drive controller 100 and the driver circuit 150 are circuits for carrying out control in instances where driving force is to be generated in the electric motor. The regeneration controller 200 and the rectifier circuit 250 are circuits for carrying out control in instances where power from the electric motor is to be regenerated. The regeneration controller 200 and the rectifier circuit 250 will be referred to collectively as a "regeneration circuit." The drive controller 100 will also be referred to as a "drive signal generating circuit." The power supply unit 300 is a circuit for supplying various power supply voltages to other circuits in the drive circuit unit 500. In FIG. 7, for convenience, only the power lines going from the power supply unit 300 to the drive controller 100 and the driver circuit 150 are shown; power lines leading to other circuits have been omitted.

FIG. 8 shows a configuration of a phase A driver circuit 120A and a phase B driver circuit 120B included in the driver circuit 150 (FIG. 7). The phase A driver circuit 120A is an H bridge circuit for delivering AC drive signals DRVA1, DRVA2 to the phase A coils 12A. The white circles next to terminal portions of blocks which indicate drive signals denote negative logic and indicate that the signal is inverted. The arrows labeled IA1, IA2 respectively indicate the direction of current flow with the A1 drive signal DRVA1 and the A2 drive signal DRVA2. The configuration of the phase B driver circuit 120B is the same as the configuration of the phase A driver circuit 120A.

FIGS. 9A-9E illustrate internal configuration and operation of the drive controller 100 (FIG. 7). The drive controller 100 has a basic clock generating circuit 510, a 1/N frequency divider 520, a PWM unit 530, a moving direction register 540, a multiplier 550, an encoder unit 560, an AD converter 570, a voltage control value register 580, and an excitation interval setting unit 590. The drive controller 100 generates both phase A drive signals and phase B drive signal, and the basic clock generating circuit 510, the divider 520, and the moving direction register 540 are used in common by both the phase-A and phase-B. FIG. 9A only depicts circuitry for phase A, for convenience of illustration. The same circuitry for phase B is also included in the drive controller 100. The other constitutional elements that exist respectively for the phase-A and phase-B are depicted only as the phase-A circuit constitution in FIG. 9A for convenience of illustration. But the same constitutional elements as those for the phase A are also provided in the drive controller 100 for the phase B.

The basic clock generating circuit 510 generates a clock signal PCL of prescribed frequency, and includes a PLL circuit for example. The frequency divider 520 generates a clock signal SDC having a frequency equal to 1/N the frequency of the clock signal PCL. The value of N is set to a prescribed constant. This value of N has been previously established in the frequency divider 520 by the CPU 110. The PWM unit 530 generates the AC single-phase drive signals DRVA1, DRVA2 (FIG. 8) based on the clock signals PCL, SDC, a multiplication value Ma supplied by the multiplier 550, a forward/reverse direction value RI supplied by the moving direction register 540, a positive/negative sign signal Pa supplied by the encoder unit 560, and an excitation interval signal Ea supplied by the excitation interval setting unit 590. This operation will be discussed later.

A value RI indicating the direction for motor rotation is established in the moving direction register 540, by the CPU 110. In the present embodiment, the motor will rotate forward when the forward/reverse direction value RI is L level, and rotate in reverse rotation when H level. The other signals Ma, Pa, Ea supplied to the PWM unit 530 are determined as follows.

The output SSA of the magnetic sensor 40 is supplied to the AD converter 570. This sensor output SSA has a range, for example, of from GND (ground potential) to VDD (power supply voltage), with the middle point thereof (=VDD/2) being the $\pi$ phase point of the output waveform, or the point at which the sine wave passes through the origin. The AD converter 570 performs AD conversion of this sensor output SSA to generate a digital value of sensor output. The output of the AD converter 570 has a range, for example, of FFh to 0h (the "h" suffix denotes hexadecimal), with the median value of 80h corresponding to the middle point of the sensor waveform.

The encoder unit 560 converts the range of the sensor output value subsequent to the AD conversion, and sets the value of the middle point of the sensor output value to 0. As a result, the sensor output value Xa generated by the encoder unit 560 assumes a prescribed range on the positive side (e.g. between +127 and 0) and a prescribed range on the negative side (e.g. between 0 and −127). However, the value supplied to the multiplier 560 by the encoder unit 560 is the absolute value of the sensor output value Xa; the positive/negative sign thereof is supplied to the PWM unit 530 as the positive/negative sign signal Pa.

The voltage control value register 580 stores a voltage control value Ya established by the CPU 110. This voltage control value Ya, together with the excitation interval signal Ea discussed later, functions as a value for setting the application voltage to the motor. The value Ya can assume a value between 0 and 1.0, for example. Assuming an instance where the excitation interval signal Ea has been set with no non-excitation intervals provided so that all of the intervals are excitation intervals, Ya=0 will mean that the application voltage is zero, and Ya=1.0 will mean that the application voltage is at maximum value. The multiplier 550 performs multiplication of the voltage control value Ya and the sensor output value Xa output from the encoder unit 560 and conversion to an integer; the multiplication value Ma thereof is supplied to the PWM unit 530.

FIGS. 9B-9E depict operation of the PWM unit 530 in instances where the multiplication value Ma takes various different values. Here, it is assumed that there are no non-excitation intervals, so that all intervals are excitation intervals. The PWM unit 530 is a circuit that, during one period of the clock signal SDC, generates one pulse with a duty factor of Ma/N. Specifically, as shown in FIGS. 9B-9E, the pulse duty factor of the single-phase drive signals DRVA1, DRVA2 increases in association with increase of the multiplication value Ma. The first drive signal DRVA1 is a signal that generates a pulse only when the sensor output SSA is positive and the second drive signal DRVA2 is a signal that generates a pulse only when the sensor output SSA is negative; in FIGS. 9B-9E, both are shown together. For convenience, the second drive signal DRVA2 is shown in the form of pulses on the negative side.

FIGS. 10A-10C depict correspondence between sensor output waveform and waveform of the drive signals generated by the PWM unit 530. In the drawing, "Hiz" denotes a state of high impedance where the magnetic coils are not excited. As described in FIGS. 9B-9E, the single-phase drive signals DRVA1, DRVA2 are generated by PWM control using the analog waveform of the sensor output SSA. Consequently, using these single-phase drive signals DRVA1, DRVA2 it is possible to supply to the coils effective voltage that exhibits changes in level corresponding to change in the sensor outputs SSA.

The PWM unit 530 is constructed such that drive signals are output only during the excitation intervals indicated by the excitation interval signal Ea supplied by the excitation interval setting unit 590, with no drive signals being output at intervals except for the excitation intervals (non-excitation intervals). FIG. 10C depicts drive signal waveforms produced in the case where excitation intervals EP and non-excitation intervals NEP have been established by the excitation interval signal Ea. During the excitation intervals EP, the drive signal pulses of FIG. 10B are generated as is; during the non-excitation intervals NEP, no pulses are generated. By establishing excitation intervals EP and non-excitation intervals NEP in this way, voltage will not be applied to the coils in proximity to the middle point of the back electromotive force waveform (i.e. in proximity to the middle point of the sensor output), thus making possible further improvement of motor efficiency. Preferably the excitation intervals EP will be established at intervals symmetric about the peak point of the back electromotive force waveform; and preferably the non-excitation intervals NEP will be established in intervals symmetric about the middle point (center) of the back electromotive force waveform.

As discussed previously, if the voltage control value Ya is set to a value less than 1, the multiplication value Ma will be decreased in proportion to the voltage control value Ya. Consequently, effective adjustment of application voltage is possible by the voltage control value Ya as well.

As will be understood from the preceding description, with the motor of the present embodiment, it is possible to adjust the application voltage using both the voltage control value Ya and the excitation interval signal Ea. In preferred practice, relationships between desired application voltage on the one hand, and the voltage control value Ya and excitation interval signal Ea on the other, will be stored in advance in table format in memory in the drive circuit unit 500 (FIG. 7). By so doing, when the drive circuit unit 500 has received a target value for the desired application voltage from the outside, it will be possible for the CPU 110, in response to the target value, to set the voltage control value Ya and the excitation interval signal Ea in the drive controller 100. Adjustment of application voltage does not require the use of both the voltage control value Ya and the excitation interval signal Ea, and it would be acceptable to use either one of them instead.

FIG. 11 is a block diagram depicting the internal configuration of the PWM unit 530 (FIG. 9A). The PWM unit 530 has a counter 531, an EXOR circuit 533, and a drive waveform shaping circuit 535. Their operation will be described below.

Figure 12:
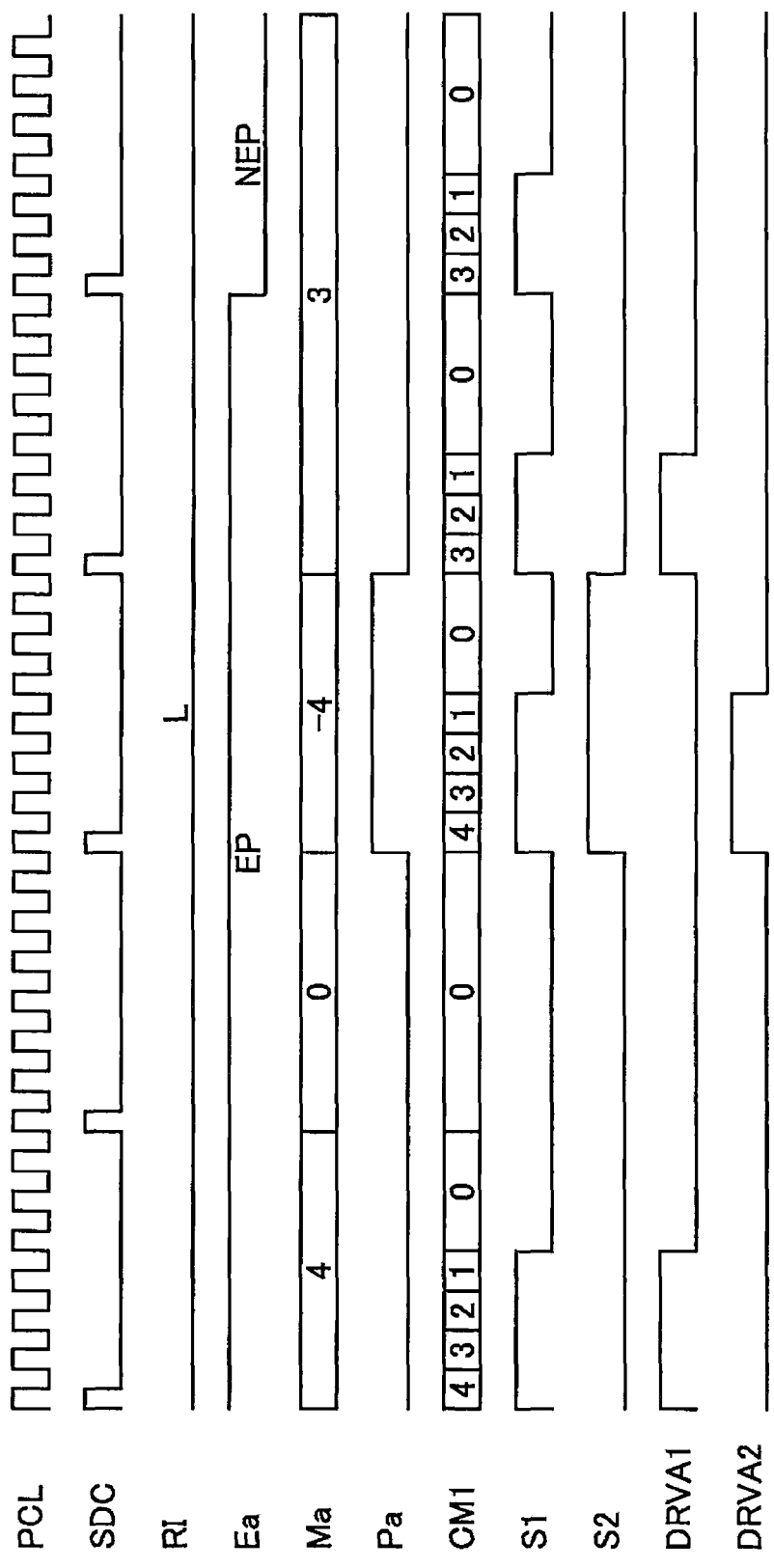
FIG. 12 is a timing chart depicting operation of the PWM unit during forward rotation of the motor.

FIG. 12 is a timing chart depicting operation of the PWM unit 530 during forward rotation of the motor. The drawing show the two clock signals PCL and SDC, the forward/reverse direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping circuit 535. For each one cycle of the clock signal SDC, the counter 531 repeats an operation of decrementing the count value CM1 to 0, in sync with the clock signal PCL. The initial value of the count value CM1 is set to the multiplication value Ma. In FIG. 12, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 that represents the exclusive OR of the positive/negative sign signal Pa and the forward/reverse direction value RI. Where the motor is rotating forward, the forward/reverse direction value RI will be at L level. Consequently, the output S2 of the EXOR circuit 533 will be a signal identical to the positive/negative sign signal Pa. The drive waveform shaping circuit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is at L level will be output as the drive signal DRVA1, and the signal during intervals in which the output S2 of the EXOR circuit 533 is at H level will be output as the drive signal DRVA2. In proximity to the right edge in FIG. 11, the excitation interval signal Ea falls to L level thereby establishing a non-excitation interval NEP. Consequently, neither of the drive signals DRVA1, DRVA2 will be output during this non-excitation interval NEP, and a state of high impedance will be maintained.

FIG. 13 is a timing chart depicting operation of the PWM unit 530 during reverse rotation of the motor. Where the motor is rotating in reverse, the forward/reverse direction value RI will be at H level. As a result, the two drive signals DRVA1, DRVA2 switch relative to FIG. 12, and it will be appreciated that the motor runs in reverse as a result.

Figure 14A:
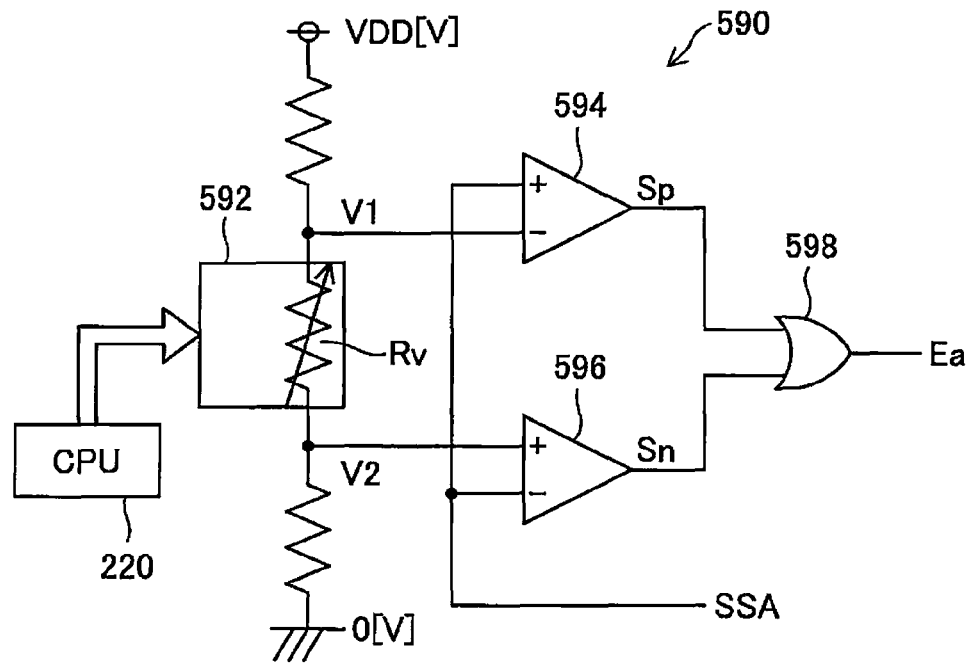
FIGS. 14A and 14B illustrate the internal configuration and operation of an excitation interval setting unit.
Figure 14B:
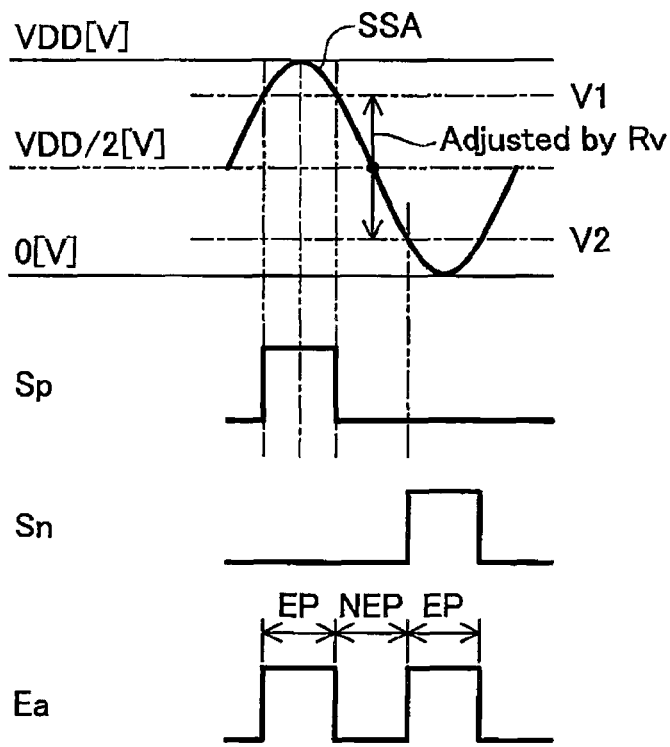

FIGS. 14A and 14B illustrate the internal configuration and operation of an excitation interval setting unit 590. The excitation interval setting unit 590 has an electronic variable resistor 592, a voltage comparators 594, 596, and an OR circuit 598. The resistance Rv of the electronic variable resistor 592 is set by the CPU 110. The voltages V1, V2 at either terminal of the electronic variable resistor 592 are supplied to one of the input terminals of the voltage comparators 594, 596. The sensor output SSA is supplied to the other input terminal of the voltage comparators 594, 596. The output signals Sp, Sn of the voltage comparators 594, 596 are input to the OR circuit 598. The output of the OR circuit 598 is the excitation interval signal Ea, which is used to differentiate excitation intervals and non-excitation intervals.

FIG. 14B depicts operation of the excitation interval setting unit 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal derived by taking the logical sum of the these output signals Sp, Sn. Consequently, as shown at bottom in FIG. 14B, the excitation interval signal Ea can be used as a signal indicating excitation intervals EP and non-excitation intervals NEP. The excitation intervals EP and non-excitation intervals NEP are established by the CPU 110, by adjusting the variable resistance Rv.

Figure 15A:
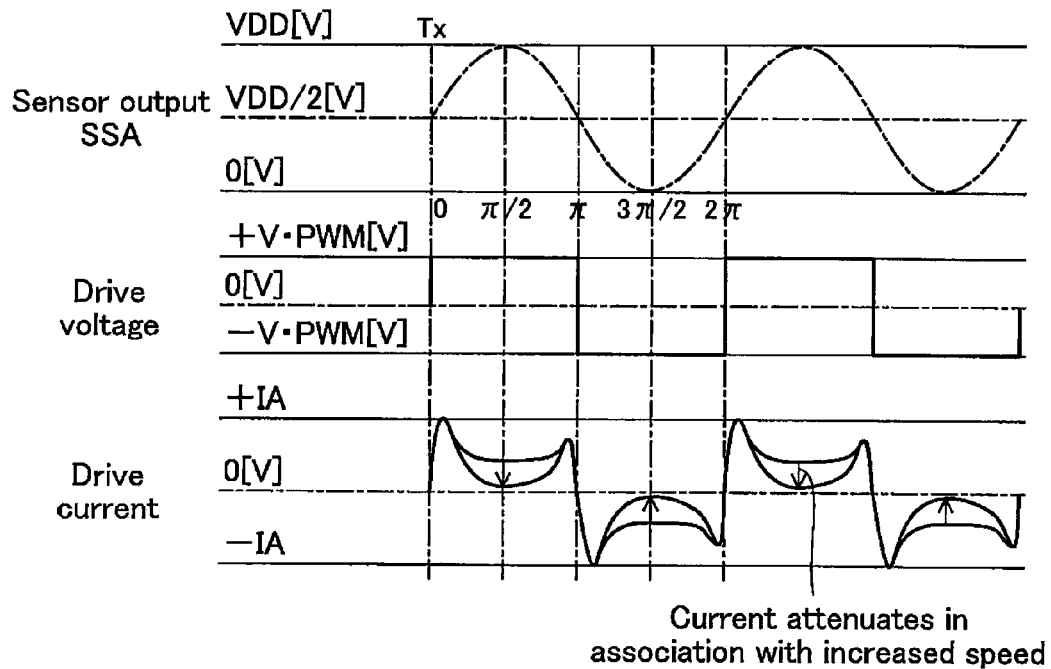
FIGS. 15A and 15B are illustrations comparing various signal waveforms in the case where the motor of the first embodiment is driven by a rectangular wave, and where driven by a sine wave.
Figure 15B:
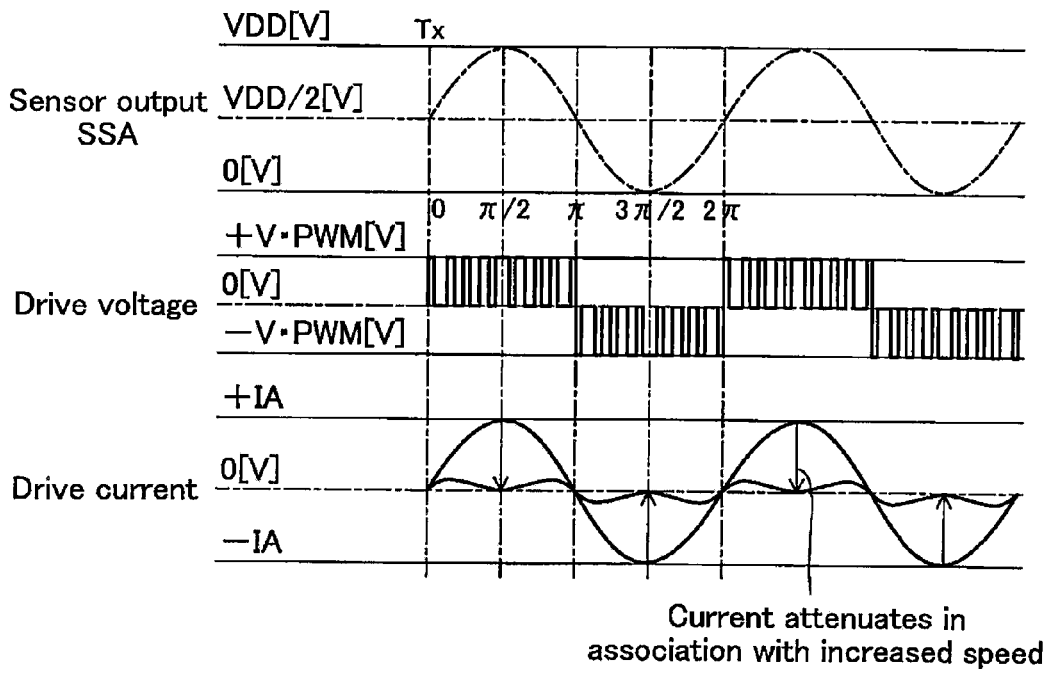

FIGS. 15A and 15B are illustrations comparing various signal waveforms in the case where the motor of the embodiment discussed above is driven by a rectangular wave, and where driven by a sine wave (for descriptive purposes, the waveform of the back electromotive force is also called a sine wave). Where a rectangular wave is employed for driving, a drive voltage of rectangular wave shape is applied to the coils. While the drive current is close to a rectangular wave at startup, it decreases as rotation speed increases. This is because the back electromotive force increases in response to the increased rotation speed (FIG. 3B). With a rectangular wave, however, despite increased rotation speed the current value will not decline appreciably in proximity to the timing of switching of the drive voltage at phase=$n\pi$, so a fairly large current will tend to flow.

On the other hand, where a sine wave is employed for driving, PWM control is employed for the drive voltage so that the effective values of the drive voltage have sine wave shape. While the drive current is close to a sine wave at startup, as rotation speed increases the drive current will decrease due to the effects of back electromotive force. With sine wave driving, the current value declines appreciably in proximity to the timing of switching of the drive voltage polarity at phase=$n\pi$. As discussed in the context of FIGS. 3A-3C, generally speaking the energy conversion efficiency of a motor is low in proximity to the timing of switching of the drive voltage polarity. With sine wave driving, the current value during intervals of low efficiency is lower than with rectangular wave, making it possible to drive the motor more efficiently.

FIG. 16 depicts another configuration example of the phase A driver circuit 120A and the phase B driver circuit 120B included in the driver circuit 150 (FIG. 7). These driver circuits 120A, 120B are furnished with amplifier circuits 122 situated in front of the gate electrodes of the transistors which make up the driver circuits 120A, 120B shown in FIG. 8. While the type of transistor also differs from that in FIG. 8, transistors of any type can be used as the transistors. In order to be able to drive the motor of the present invention over a wider operating range with regard to torque and speed, it will be preferable to establish variable power supply voltage VDD of the driver circuits 120A, 120B. Where the power supply voltage VDD has been changed, the level of the drive signals DRVA1, DRVA2, DRVB1, DRVB2 applied to the gate voltages of the transistors will change proportionally therewith. By so doing the motor can be driven using a wider power supply voltage VDD range. The amplifier circuits 122 are circuits for changing the level of the drive signals DRVA1, DRVA2, DRVB1, DRVB2. In preferred practice the power supply unit 300 of the drive circuit unit 500 shown in FIG. 7 will supply variable power supply voltage VDD to the driver circuit 150.

Figure 17:
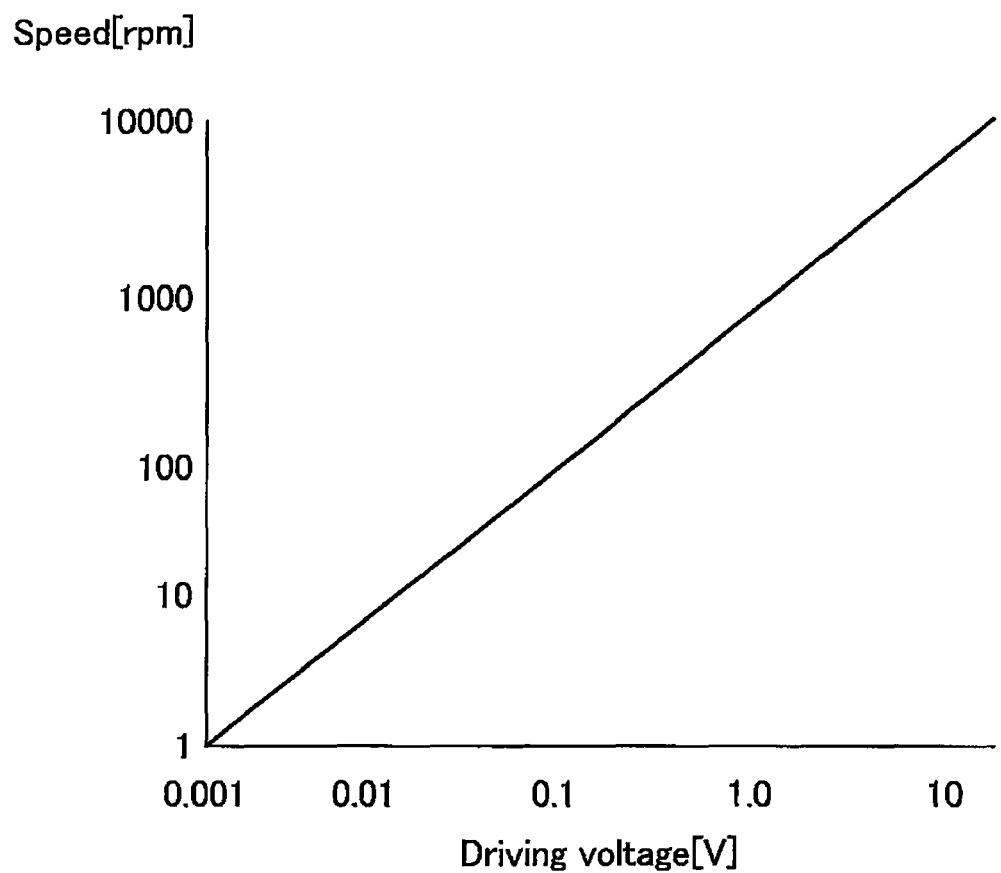
FIG. 17 shows the speed of the motor of the first embodiment in the absence of load.

FIG. 17 shows the speed of the motor of the embodiment in the absence of load. As will be apparent from the graph, in the absence of load the motor of the embodiment will rotate at stable speed down to very low speed. The reason is that since there is no magnetic core, cogging does not occur.

Figure 18:
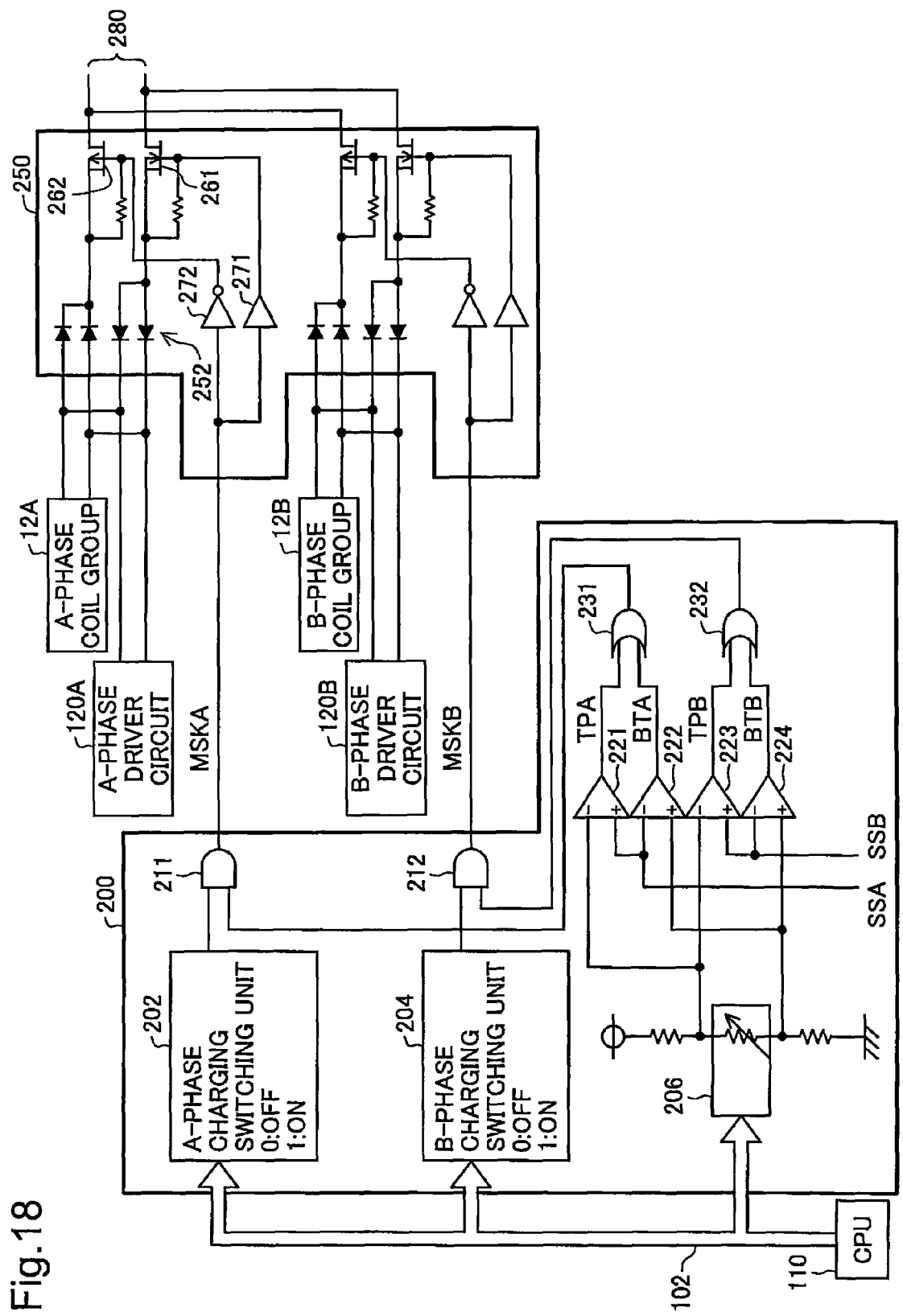
FIG. 18 illustrates the internal configuration of the regeneration controller and rectifier circuit.

FIG. 18 illustrates the internal configuration of the regeneration controller 200 and rectifier circuit 250 shown in FIG. 6. The regeneration controller 200 comprises an phase A charge switching unit 202 and a phase B charge switching unit 204, both connected to the bus 102, and an electronically variable resistor 206. The output signals of the two charge switching units 202, 204 are applied to the input terminals of the two AND circuits 211, 212.

The phase A charge switching unit 202 outputs a signal of a "1" level when the regenerative power from the phase A coils 12A is recovered, and outputs a signal of a "0" level when the power is not recovered. The same is true for the phase B charge switching unit 204. The switching of those signal levels is conducted with the CPU 110. The presence or absence of regeneration from the phase A coils 12A and the presence or absence of regeneration from the phase B coil 12B can be set independently. Therefore, for example, electric power can be regenerated from the phase B coils 12B, while generating a drive force in the motor by using the phase A coils 12A.

The drive controller 100 shown in FIG. 7, similarly, may have a configuration such that whether or not the drive force is generated by using the phase A coils 12A and whether or not the drive force is generated by using the phase B coils 12B can be set independently. In such a case, the motor can be operated in an operation mode such that a drive force is generated in any one of the two sets of coils 12A, 12B, while electric power is regenerated in the other coils.

The voltage across the electronically variable resistor 206 is applied to one of the two input terminals of the four voltage comparators 221-224. The phase A sensor signal SSA and phase B sensor signal SSB are applied to the other input terminal of the voltage comparators 221-224. The output signals TPA, BTA, TPB, BTB of the four voltage comparators 221-224 can be called "mask signals" or "permission signals".

The mask signals TPA, BTA for the phase A coils are inputted into the OR circuit 231, and the mask signals TPB, BTB for the phase B are inputted into the other OR circuit 232. The outputs of those OR circuits 231, 232 are supplied to the input terminals of the above-mentioned two AND circuits 211, 212. The output signals MSKA, MSKB of those AND circuits 211, 212 are called "mask signals" or "permission signals".

The configurations of the four voltage comparators 221-224 and the two OR circuits 231, 232 are identical to two sets of the voltage comparators 594, 596, and the OR circuit 598 of the excitation interval setting unit 590 shown in FIG. 13A. Therefore, the output signal of the OR circuit 231 for the phase A coils is similar to the excitation interval signal Ea shown in FIG. 14B. Further, when the output signal of the phase A charge switching unit 202 is at a "1" level, the mask signal MSKA outputted from the AND circuit 211 for the phase A coils is identical to the output signal of the OR circuit 231. Those operations are identical to those relating to the phase B.

The rectifier circuit 250 has the circuitry for the phase A coils which includes a full-wave rectifier circuit 252 comprising a plurality of diodes, two gate transistors 261, 262, a buffer circuit 271, and an inverter circuit 272 (NOT circuit). The identical circuitry is also provided for the phase B. The gate transistors 261, 262 are connected to the power wiring 280 for regeneration. It is preferable to use Schottky diodes which have excellent characteristics of low Vf as the plurality of diodes.

During power regeneration, the AC power generated in the phase A coils 12A is rectified with the full-wave rectifier circuit 252. The mask signal MSKA for the phase A coils and the inverted signal thereof are supplied to the gates of the gate transistors 261, 262, and the gate transistors 261, 262 are ON/OFF controlled accordingly. Therefore, within a period in which at least one of the mask signals TPA, BTA outputted from the voltage comparators 221, 222 is at an H level, the regenerated power is outputted to the power source wiring 280. On the other hand, within an interval in which both mask signals TPA, BTA are at an L level, power regeneration is inhibited.

As clearly follows from the explanation provided hereinabove, the regenerated power can be recovered by using the regeneration controller 200 and rectifier circuit 250. Furthermore, the regeneration controller 200 and rectifier circuit 250 can restrict the interval in which the regenerated power from the phase A coils 12A and phase B coils 12B is recovered, according to the mask signal MSKA for the phase A coils and the mask signal MSKB for the phase B coils, thereby making it possible to adjust the quantity of the regenerated power.

In the electrically powered device 700 of the first embodiment, the shaft 64 is fastened to the stator units 10, while the respective rotor units 30 rotate about the shaft 64. The driven members, for example, the wheels 71, are connected with the respective rotor units 30. This structure enables the driven members to be rotated without rotating the center shaft of the motors. The structure of the electrically powered device 700 enables the three brushless motors 700A, 700B, and 700C having different or identical characteristics to be arranged about the shaft 64.

A3. Other Aspects of Electrically Powered Device of First Embodiment

Figure 19:
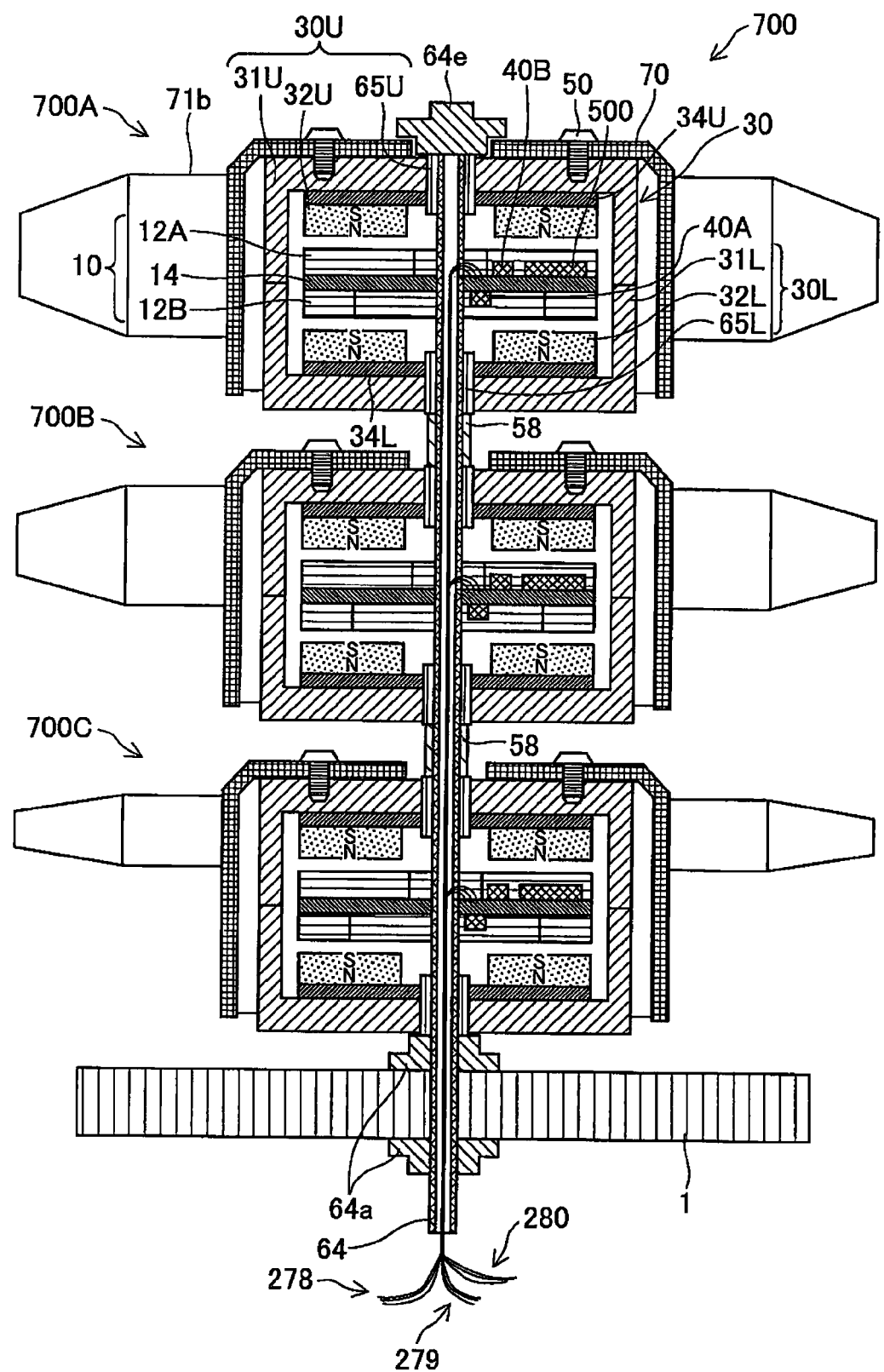
FIGS. 19 and 20 are sectional views respectively showing modified structures of the electrically powered device of the first embodiment.
Figure 20:
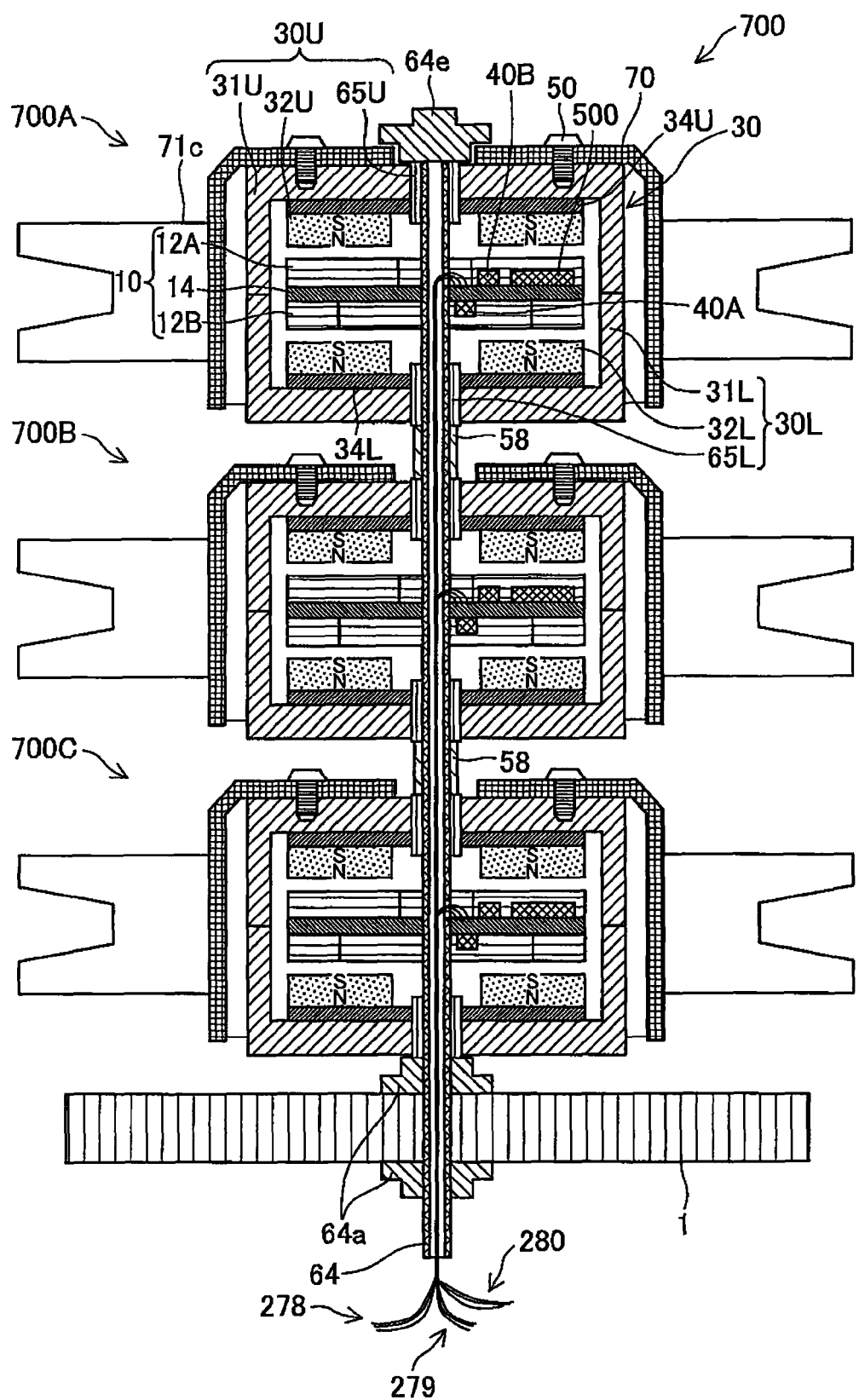

FIGS. 19 and 20 are sectional views respectively showing modified structures of the electrically powered device 700 of the first embodiment. In the structure of the first embodiment, the wheels 71 are attached to the outer circumferences of the respective motors 700A, 700B, and 700C. In the modified structure of FIG. 19, the wheels 71 are replaced by gears 71b, and the brushless motors 700A, 700B, and 700C are used as parts of the respective gears. In the modified structure of FIG. 20, pulleys 71c are provided, in place of the gears 71b.

The three brushless motors 700A, 700B, and 700C of the electrically powered device 700 are independently controllable and drivable. Application of the electrically powered device 700 having this structure to gears or pulleys desirably saves the space for the gears or the pulleys driven independently.

Figure 21:
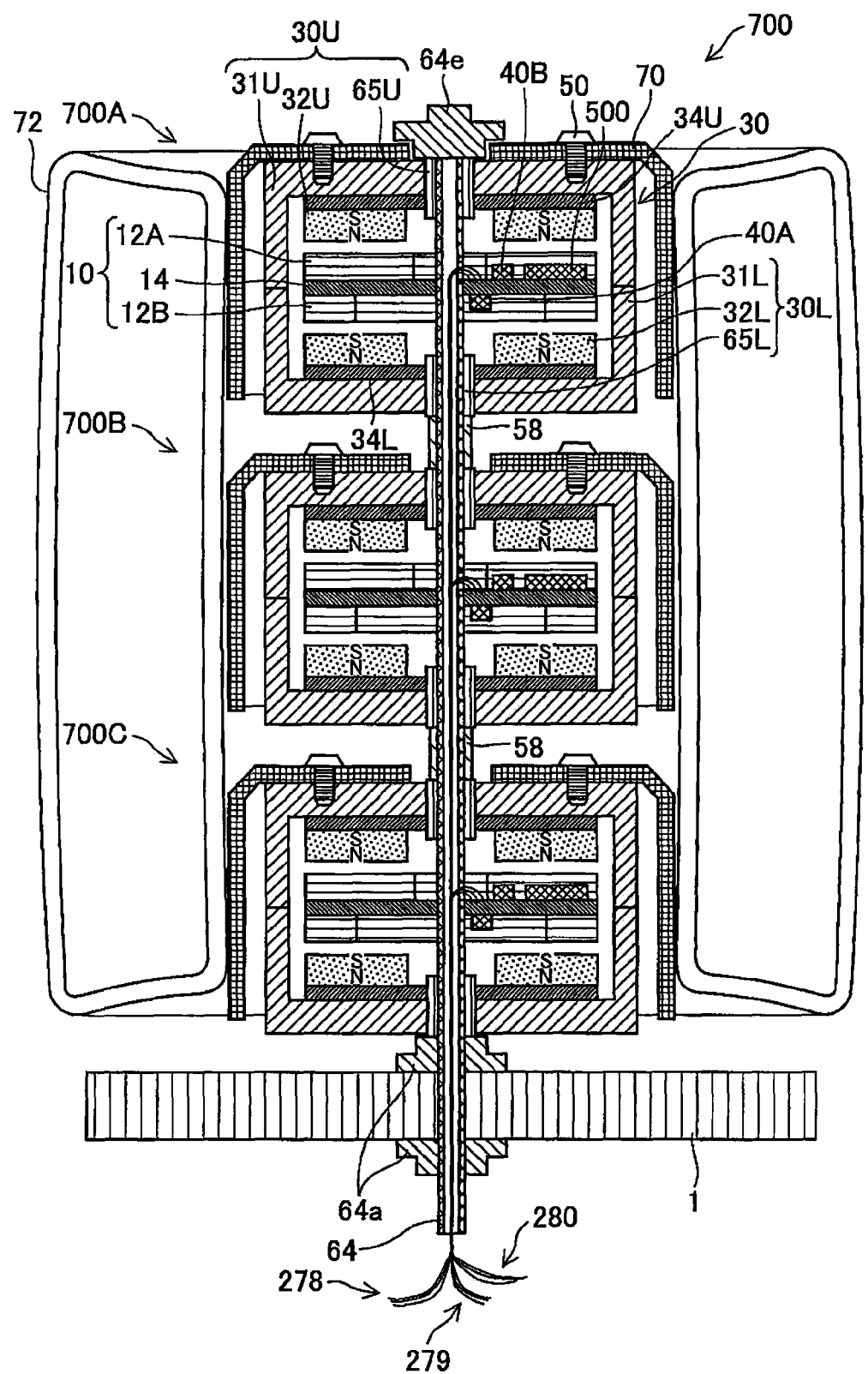
FIG. 21 is a sectional view showing still another modified structure of the electrically powered device of the first embodiment.

FIG. 21 is a sectional view showing still another modified structure of the electrically powered device 700 of the first embodiment. In the structure of the first embodiment, the wheels 71 are attached to the outer circumferences of the respective brushless motors 700A, 700B, and 700C. In the modified structure of FIG. 21, in place of the three small wheels 71, one large wheel 72 is attached to the outer circumference of the three brushless motors 700A, 700B, and 700C. This modified structure is preferably applied to rotate the large wheel 72 at a fixed rotation speed in a fixed rotating direction by the three brushless motors 700A, 700B, and 700C. Application of this modified structure ensures output of a higher torque or power, compared with the structure using only one motor.

B. SECOND EMBODIMENT

Figure 22:
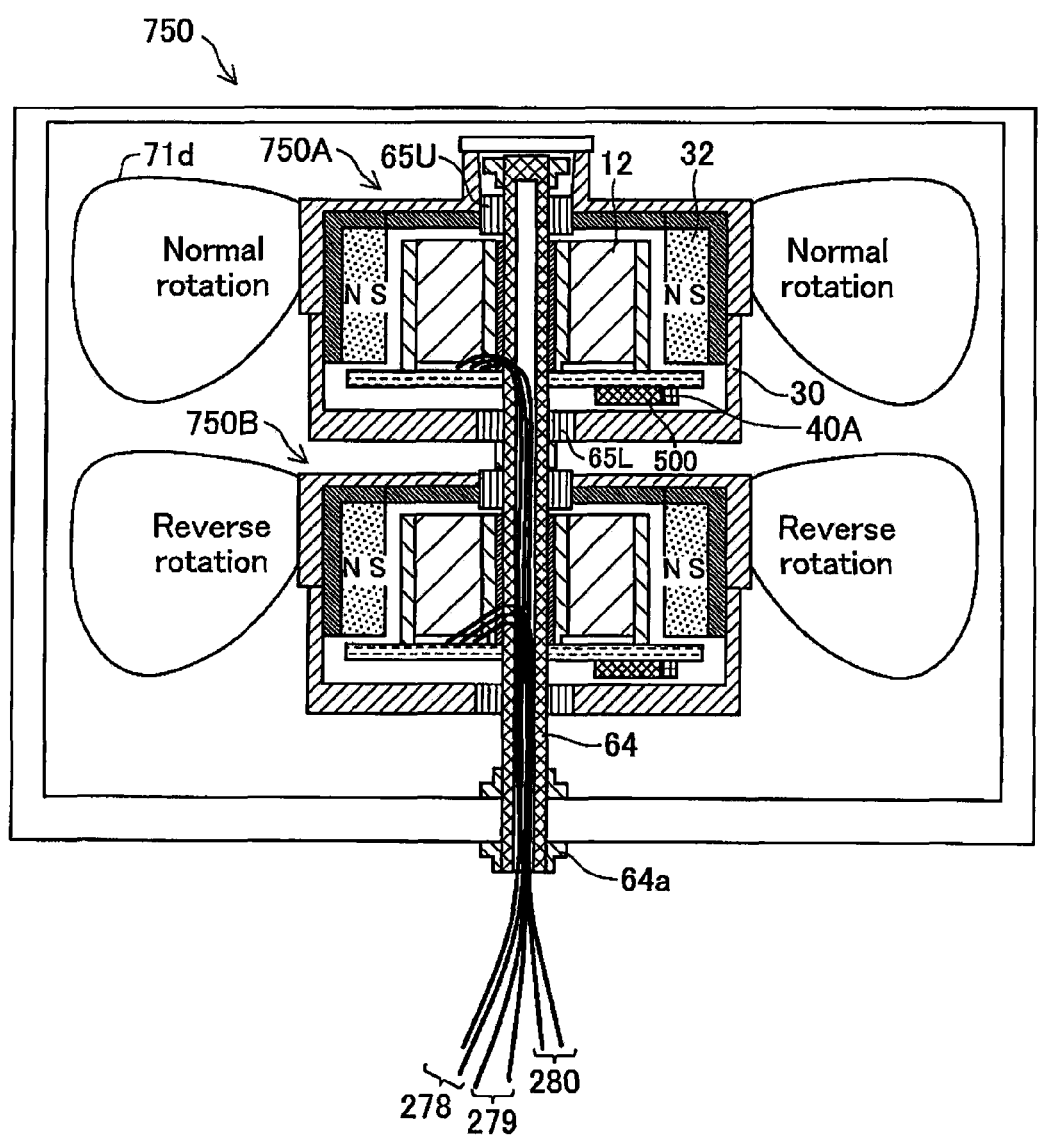
FIG. 22 is a sectional view showing the schematic structure of an electrically powered device in a second embodiment.

FIG. 22 is a sectional view showing the schematic structure of an electrically powered device 750 in a second embodiment. The structure of the electrically powered device 750 of the second embodiment is similar to that of the electrically powered device 700 of the first embodiment shown in FIG. 1, except that a permanent magnet 32 is located on the outer circumference of a coil 12, that the number of motors is reduced from three to two, and that the wheels 71 are replaced by blades 71d. The electrically powered device 750 of FIG. 22 is accordingly constructed as a fan motor. This arrangement of the permanent magnet 32 and the coil 12 similar to the arrangement in an outer rotor-type motor enables the driven members, for example, the blades 71d, to be rotated without rotating the center shaft of the motors. Setting reverse rotating directions in a first brushless motor 750A and a second brushless motor 750B effectively enhances the air blowing efficiency of the fan motor.

The electrically powered device 750 is explained as the fan motor with reference to FIG. 22. Application of the electrically powered device 750 as contra-rotating rotors enables easy construction of a contra-rotating helicopter without requiring any complicated shaft mechanism. The electrically powered device 750 may also be constructed as contra-rotating propellers or as contra-rotating screws to be used as the power source of aircraft or boats and ships. The electrically powered device 750 is not restricted to such a double inversion structure but is also constructed as a triple or greater inversion structure to give the stable lifting power or propulsion power.

C. THIRD EMBODIMENT

Figure 23:
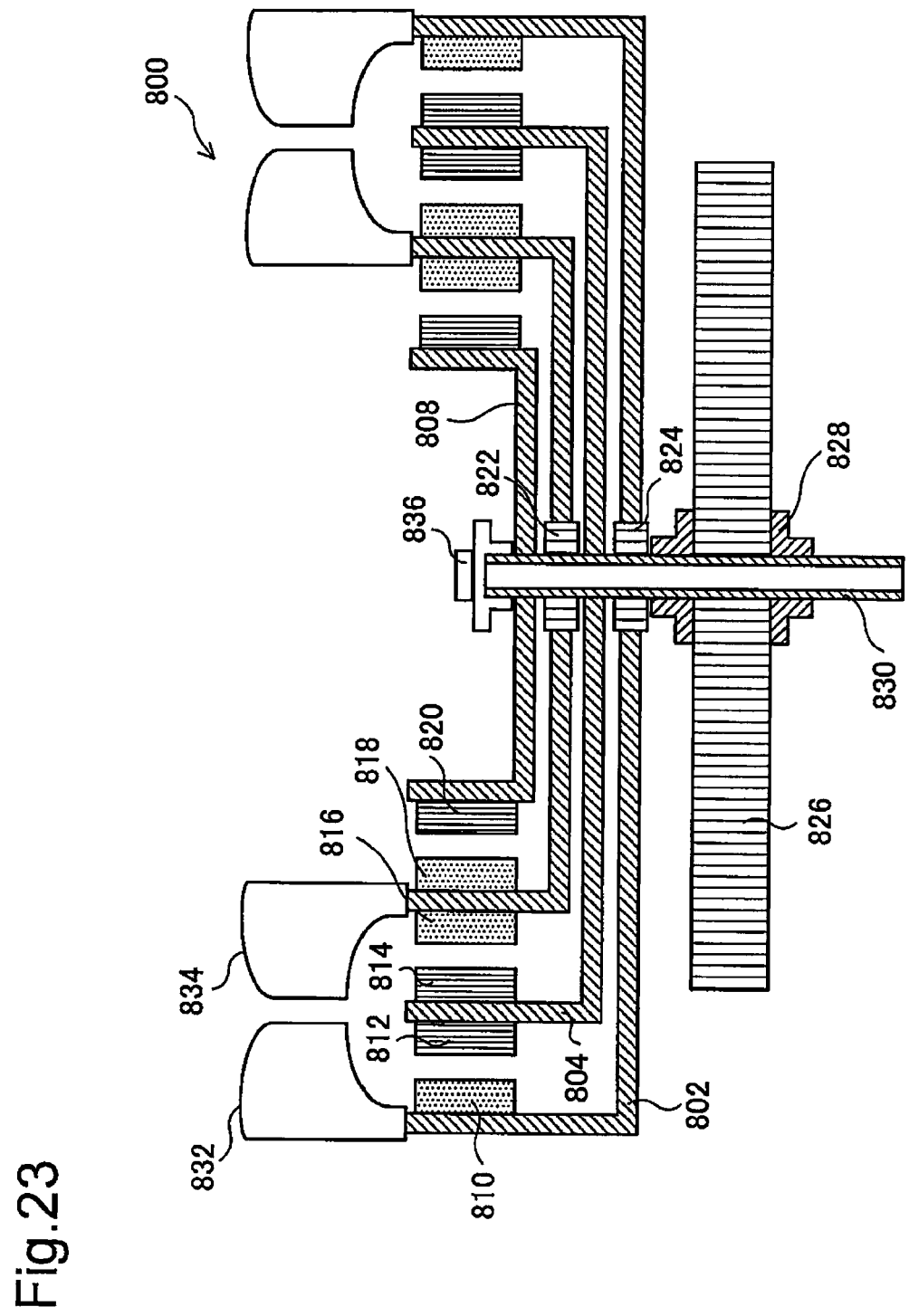
FIG. 23 is a sectional view showing the schematic structure of an electrically powered device in a third embodiment.

FIG. 23 is a sectional view showing the schematic structure of an electrically powered device 800 in a third embodiment. Magnetic sensors, drive circuit units, and power lines are omitted from the illustration of FIG. 23. The electrically powered device 800 has stators 804 and 808 fastened to a shaft 830 and rotors 802 and 806 arranged to rotate about the shaft 830. The stators 804 and 808 and the rotors 802 and 806 have quasi disk shapes. The rotors 802 and 806 respectively have blades 832 and 834 and are designed to be rotatable via bearings 824 and 822. The shaft 830 is attached to an electrically powered device support member 826 via a shaft fixation element 828 and is fastened in a non-rotatable manner. A sealing cap 836 is mounted on an upper end of the shaft 830.

The rotor 802 has a permanent magnet 810 and is rotated about the shaft 830 by an electromagnetic coil 812 mounted on the stator 804. The rotor 806 has permanent magnets 816 and 818 and is rotated about the shaft 830 by electromagnetic coils 814 and 820 mounted on the stators 804 and 808.

In the electrically powered device 800 of this structure, the rotors 802 and 806 are independently drivable. Rotating the rotors 802 and 806 in reverse directions enables the electrically powered device 800 to be used as a pressure machine of the high efficiency.

D. MODIFIED EXAMPLES

The present invention is not limited to the embodiments described hereinabove, and may be reduced to practice in various other ways without departing from the spirit thereof. Modifications such as the following are possible, for example.

D1. Modified Example 1

The electrically powered device 700 of the first embodiment has the three brushless motors arranged on the shaft 64 as shown in FIG. 1. The electrically powered device 750 of the second embodiment has the two brushless motors arranged on the shaft 64 as shown in FIG. 22. The number of brushless motors provided in the electrically powered device is, however, not restricted to two or three but may be any arbitrary number.

D2. Modified Example 2

In the structure of the first embodiment shown in FIG. 1 or its modified structure shown in FIG. 19, the wheels 71 or the gears 71*b* are attached to the respective wheel bases 70. The wheels 71 or the gears 71*b* may be attached directly to the respective rotor units 30.

D3. Modified Example 3

In the electrically powered device 800 of the third embodiment shown in FIG. 23, the blades 832 and 834 are attached to the rotors 802 and 806. Any other driven members may be attached to the rotors 802 and 806, instead of the blades 832 and 834. For example, attachment of cutting blades to the rotors 802 and 806 constructs the electrically powered device 800 as a cutting machine. The number of rotors is not restricted to two but may be three or any greater number.

D4. Modified Example 4

The present invention is applicable to various kinds of devices. For example, the present invention is implemented in a motor in any of various devices such as fan motors, clocks (for driving the hands), drum type washing machines (single rotation), jet coasters, railway cars, vibrating motors, and the like. Where the present invention is implemented in a fan motor, the various advantages mentioned previously (low power consumption, low vibration, low noise, minimal rotation irregularity, low heat emission, and long life) is particularly notable. Such fan motors can be employed, for example, as fan motors for various devices such as digital display devices, vehicle on-board devices, fuel cell type PCs, fuel cell type digital cameras, fuel cell type video cameras, fuel cell type mobile phones, various other fuel cell-powered devices, and projectors. The motor of the present invention may also be utilized as a motor for various types of household electric appliances and electronic devices. For example, a motor in accordance with the present invention may be employed as a spindle motor in an optical storage device, magnetic storage device, polygon mirror drive, or the like. The motor of the present invention may also be utilized as a motor for a movable body or a robot.

Figure 24:
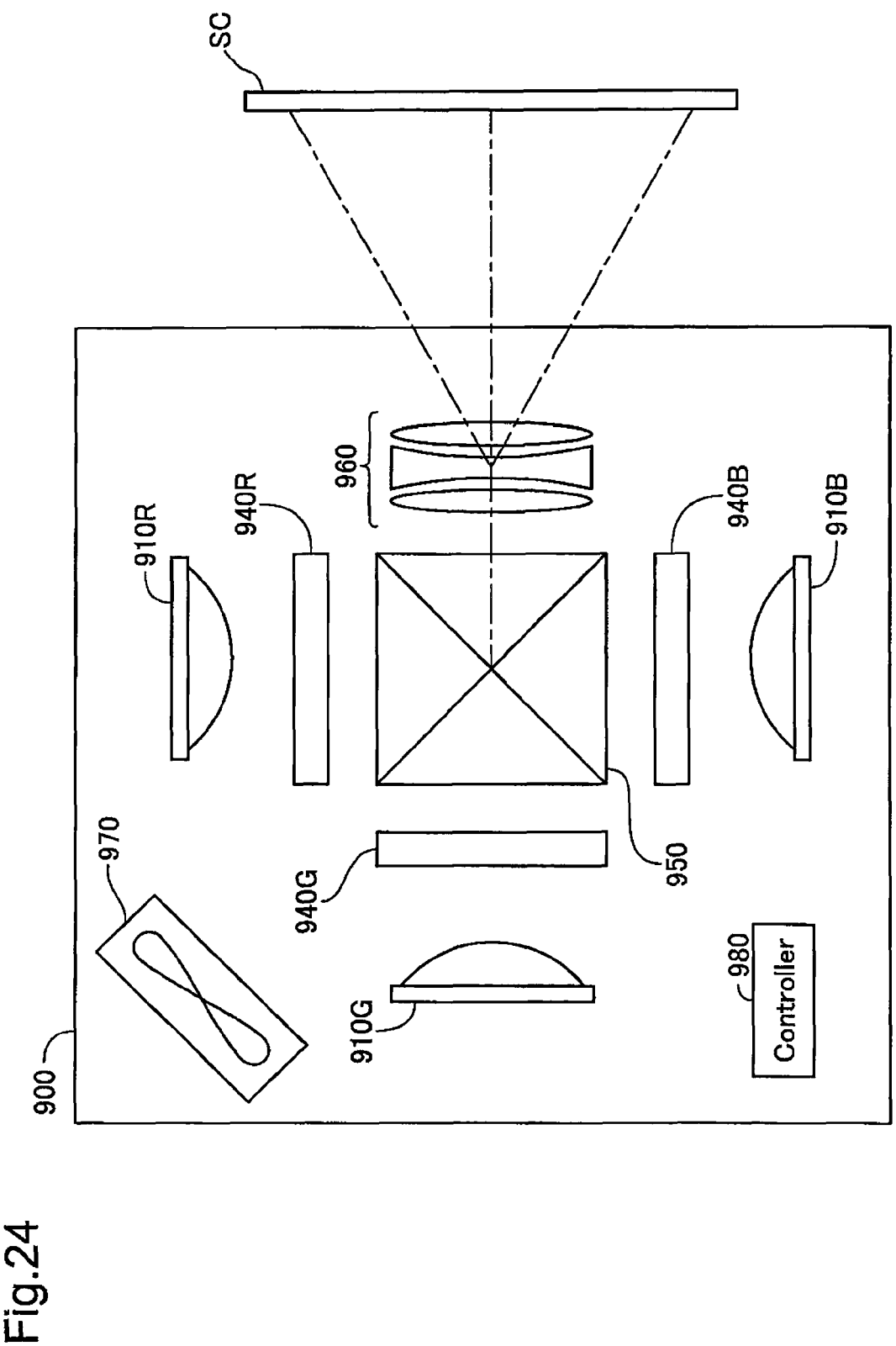
FIG. 24 is an illustration depicting a projector which utilizes an electrically powered device according to the present invention.

FIG. 24 is an illustration depicting a projector which utilizes an electrically powered device according to the present invention. This projector 900 has three light sources 910R, 910G, 910B for emitting light of the three colors red, green, and blue; liquid crystal light valves 940R, 940G, 940B for modulating light of the three colors; a cross dichroic prism 950 for synthesizing modulated light of the three colors; a projection lens system 960 for projecting light synthesized from the three colors onto a screen SC; a cooling fan 970 for cooling the interior of the projector; and a controller 980 for controlling the entire projector 900. Any of the various electrically powered devices described above may be used as the motor for driving the cooling fan 970.

Figure 25A:
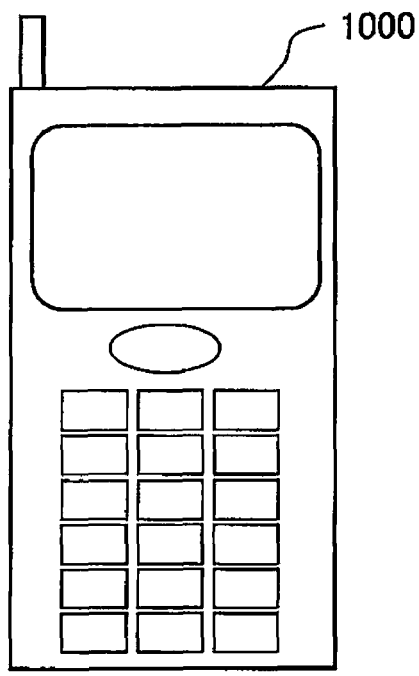
FIGS. 25A to 25C illustrate a fuel cell type mobile phone which utilizes an electrically powered device according to the present invention.
Figure 25B:
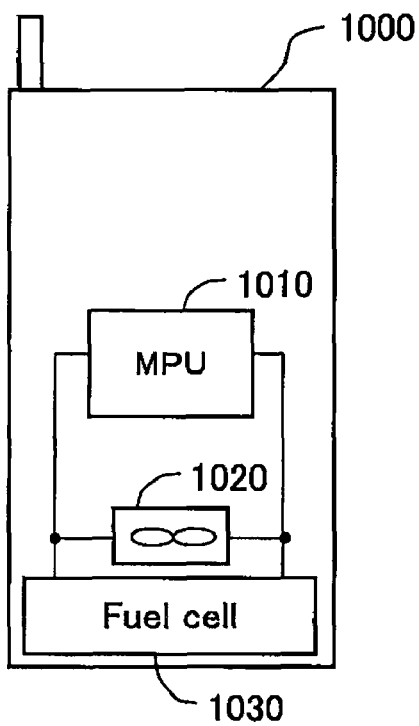
Figure 25C:
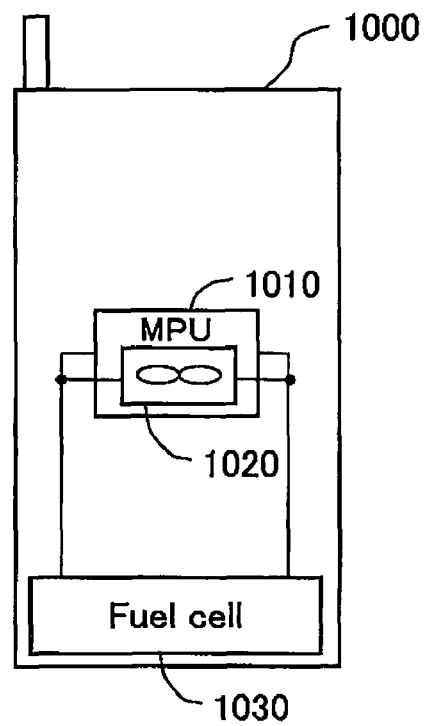

FIGS. 25A to 25C illustrate a fuel cell type mobile phone which utilizes an electrically powered device according to the present invention. FIG. 25A shows an exterior view of a mobile phone 1000, and FIG. 25B shows an example of internal configuration. The mobile phone 1000 includes an MPU 1010 for controlling operation of the mobile phone 1000; a fan 1020; and a fuel cell 1030. The fuel cell 1030 supplies power to the MPU 1010 and to the fan 1020. The fan 1020 blows air into the mobile phone 1000 from the outside in order to supply air to the fuel cell 1030, or in order to expel moisture evolved in the fuel cell 1030 from the inside of the mobile phone 1000 to the outside. The fan 1020 may also be positioned on the MPU 1010 as shown in FIG. 25C, to cool the MPU 1010. Any of the various brushless motors described above can be used as the motor for driving the fan 1020.

What is claimed is:

1. An electrically powered device having multiple brushless motors, each of the brushless motors comprising:

a stator structured to have electromagnetic coils and a position sensor, the stator having a first face and a second face, the electromagnetic coils having two coil groups for two phases including a first coil group positioned on the first face of the stator and a second coil group positioned on the second face of the stator, the first coil group and the second coil group being positioned at locations phase-shifted by π/2 from each other;

a shaft fastened to the stator, the shaft having a through-hole, the through-hole being formed along an axis of the shaft;

a rotor unit structured to have permanent magnets and arranged to rotate around the shaft, the permanent magnets having two magnet groups including a first magnet group and a second magnet group, the rotor unit having a first rotor and a second rotor connected to the first rotor, the first rotor and the second rotor sandwiching the stator therebetween, the first rotor being positioned on one side of the stator and including the first magnet group, the second rotor being positioned on another side of the stator and including the second magnet group, the first magnet group and the second magnet group having magnetic poles and being positioned such that the magnetic poles that face towards the stator have mutually different polarities;

a driven member linked to the rotor;

a first wiring that is coupled to one of the brushless motors, the first wiring being provided through an inside of a part of the through-hole which the rotor unit actually rotates around; and a second wiring that is coupled to another of the brushless motors, the second wiring being provided through the inside of the part of the through-hole which the rotor unit actually rotates around; wherein all of the brushless motors are arranged to be spaced apart from one another.

2. The motor electrically powered device according to claim 1, wherein the driven member is a blade.

3. The electrically powered device according to claim 1, wherein each of the brushless motors has a different performance characteristic.

4. The electrically powered device according to claim 1, wherein an on or off state of each of the brushless motors is independently controlled according to an application of the electrically powered device.

5. The electrically powered device according to claim 1, wherein the brushless motors are simultaneously used in different modes, the different modes including a drive mode and a regenerative mode.

* * * * *